United States Patent
Silverstein et al.

(10) Patent No.: US 7,131,737 B2
(45) Date of Patent: Nov. 7, 2006

(54) HOUSING FOR MOUNTING A BEAMSPLITTER AND A SPATIAL LIGHT MODULATOR WITH AN OUTPUT OPTICAL PATH

(75) Inventors: Barry D. Silverstein, Rochester, NY (US); Franklin D. Ehrne, Rochester, NY (US)

(73) Assignee: Moxtek, Inc., Orem, UT (US)

( * ) Notice: Subject to any disclaimer, the term of this patent is extended or adjusted under 35 U.S.C. 154(b) by 277 days.

(21) Appl. No.: 10/902,319

(22) Filed: Jul. 29, 2004

(65) Prior Publication Data

US 2004/0263806 A1 Dec. 30, 2004

Related U.S. Application Data

(63) Continuation-in-part of application No. 10/163,228, filed on Jun. 5, 2002, now Pat. No. 6,805,445.

(51) Int. Cl.
- G03B 21/14 (2006.01)
- G02B 5/30 (2006.01)
- G02B 27/28 (2006.01)
- G02F 1/1335 (2006.01)

(52) U.S. Cl. .......... 353/119; 353/20; 359/500; 349/9; 349/58

(58) Field of Classification Search .......... 353/20, 353/119; 359/486, 500; 349/9, 58, 96
See application file for complete search history.

(56) References Cited

U.S. PATENT DOCUMENTS

| | | | |
|---|---|---|---|
| 2,403,731 A | 7/1946 | MacNeille | 359/488 |
| 4,701,028 A | 10/1987 | Clerc et al. | 349/98 |
| 5,039,185 A | 8/1991 | Uchida et al. | 349/119 |
| 5,298,199 A | 3/1994 | Hirose et al. | 264/2.6 |
| 5,383,053 A | 1/1995 | Hegg et al. | 359/486 |
| 5,576,854 A | 11/1996 | Schmidt et al. | 349/5 |
| 5,619,352 A | 4/1997 | Koch et al. | 349/89 |
| 5,652,667 A | 7/1997 | Kuragane | 349/42 |
| 5,748,368 A | 5/1998 | Tamada et al. | 359/486 |
| 5,808,795 A | 9/1998 | Shimomura et al. | 359/488 |
| 5,844,722 A | 12/1998 | Stephens et al. | 359/637 |
| 5,912,762 A | 6/1999 | Li et al. | 359/352 |
| 5,918,961 A | 7/1999 | Ueda | 359/20 |

(Continued)

OTHER PUBLICATIONS

J. Chen, K.-H. Kim, J.-J. Jyu, and J. H. Souk; Optimum Film Compensation Modes for TN and VA LCDs; SID 98 Digest, pp. 315-318.

(Continued)

*Primary Examiner*—W. B. Perkey
*Assistant Examiner*—Rochelle Blackman
(74) *Attorney, Agent, or Firm*—Thorpe North & Western

(57) ABSTRACT

A housing (500) for a wire grid polarizing beamsplitter (240) and a spatial light modulator (210) in alignment with an output optical path has a front plate having an opening (502) for admitting incident illumination and a modulator mounting plate (506) for mounting the spatial light modulator (210) in the optical output path. First and second polarizer support plates (512, 520) extend between the front plate and the modulator mounting plate (506), with their respective facing inner surfaces providing coplanar support features for supporting the wire grid polarizing beamsplitter (240) within a fixed plane. The coplanar support features allow rotation of the wire grid polarizing beamsplitter (240) with respect to the output axis. The wire grid polarizing beamsplitter (240) has its surface at a fixed angle with respect to the surface of the spatial light modulator (210), the angle defining an output optical axis along the output optical path.

10 Claims, 14 Drawing Sheets

U.S. PATENT DOCUMENTS

| | | | |
|---|---|---|---|
| 5,969,861 A | 10/1999 | Ueda et al. | 359/488 |
| 5,978,056 A | 11/1999 | Shintani et al. | 349/137 |
| 6,122,103 A | 9/2000 | Perkins et al. | 359/486 |
| 6,234,634 B1 | 5/2001 | Hansen et al. | 353/20 |
| 6,243,199 B1 | 6/2001 | Hansen et al. | 353/20 |
| 6,288,840 B1 | 9/2001 | Perkins et al. | 359/486 |
| 6,460,998 B1 * | 10/2002 | Watanabe | 353/20 |
| 6,585,378 B1 | 7/2003 | Kurtz et al. | 353/31 |
| 6,769,779 B1 * | 8/2004 | Ehrne et al. | 353/120 |
| 2003/0117708 A1 | 6/2003 | Kane | 359/513 |
| 2003/0128320 A1 | 7/2003 | Mi et al. | 349/117 |
| 2003/0133079 A1 | 7/2003 | Cobb | 353/31 |
| 2003/0218722 A1 * | 11/2003 | Tsao et al. | 353/20 |

OTHER PUBLICATIONS

G.H. Ho, C.H. Chen, Y.C. Fang, H.S. Lin, C.R. Ou, and T.Y. Chen; "The Mechanical-Optical Properties of Wire-Grid Type Polarizer in Projection Display System" SID 02 Digest, pp. 648-651.

I. Richter, P.-C. Sun, F. Xu, and Y. Fainman; Design Considerations of Form Birefringent Microstructures; Applied Optics, May 1995, vol. 34, No. 14, pp. 2421-2429.

* cited by examiner

HOUSING FOR MOUNTING A BEAMSPLITTER AND A SPATIAL LIGHT MODULATOR WITH AN OUTPUT OPTICAL PATH

CROSS REFERENCE TO RELATED APPLICATIONS

This is a continuation-in-part of application Ser. No. 10/163,228, filed Jun. 5, 2002 now U.S. Pat. No. 6,805,445, entitled PROJECTION DISPLAY USING A WIRE GRID POLARIZATION BEAMSPLITTER WITH COMPENSATOR, by Silverstein et al.

FIELD OF THE INVENTION

This invention generally relates to digital projection apparatus employing liquid crystal devices for image forming and more particularly to an apparatus and method for achieving high levels of contrast by providing a mechanical housing in which a wire grid polarization beamsplitter is rotated in plane in combination with a liquid crystal display (LCD) and a polarization compensator for minimizing light leakage in the pixel black (OFF) state.

BACKGROUND OF THE INVENTION

In order to be considered as suitable replacements for conventional film projectors, digital projection systems must meet demanding requirements for image quality. In particular, to provide a competitive alternative to conventional cinematic-quality projectors, digital projection systems need to provide high resolution, wide color gamut, high brightness (>10,000 screen lumens), and frame-sequential system contrast ratios exceeding 1,000:1. In addition, the digital systems must also provide constancy of image quality, image data security, low equipment purchase and maintenance costs, and low data distribution costs, to make a switchover from conventional film based systems compelling.

As discussed in commonly-assigned U.S. Pat. No. 6,585,378 (Kurtz et al.), liquid crystal displays (LCD) can be used in the construction of digital cinema projection systems. The LCD forms an image as an array of pixels by selectively modulating the polarization state of incident light for each corresponding pixel. Among other examples of electronic projection apparatus that employ LCD spatial light modulators are those disclosed in U.S. Pat. No. 5,808,795 (Shimomura et al.) and U.S. Pat. No. 5,918,961 (Ueda). A few years ago, JVC demonstrated an LCD-based projector capable of high-resolution (providing 2,000×1,280 pixels), high frame sequential contrast (in excess of 1,000:1), and high light throughput (nominally, up to 12,000 lumens). This system utilized three vertically aligned (VA) (also referred as homeotropic) LCDs (one per color) driven or addressed by cathode ray tubes (CRTs).

JVC has also developed a new family of vertically aligned LCDs, which are directly addressed via a silicon backplane (LCOS), rather than indirectly by a CRT. The JVC LCD devices are described, in part, in U.S. Pat. No. 5,652,667 (Kuragane) and U.S. Pat. No. 5,978,056 (Shintani et al.) In contrast to most twisted nematic or cholesteric LCDs, vertically aligned LCDs promise to provide much higher modulation contrast ratios (in excess of 2,000:1). It is instructive to note that, in order to obtain on screen frame sequential contrast of 1,000:1 or better, the entire system must produce >1,000:1 contrast, and both the LCDs and any necessary polarization optics must each separately provide ~2,000:1 contrast. Notably, while polarization compensated vertically aligned LCDs can provide contrast >20,000:1 when modulating collimated laser beams, these same modulators may exhibit contrasts of 500:1 or less when modulating the same collimated laser beams without the appropriate polarization compensation. Modulation contrast is also dependent on the spectral bandwidth and angular width (F#) of the incident light, with contrast generally dropping as the bandwidth is increased or the F# is decreased. Modulation contrast within LCDs can also be reduced by residual de-polarization or mis-orienting polarization effects, such as thermally induced stress birefringence. Such effects can be observed in the far field of the device, where the ideally observed "iron cross" polarization contrast pattern takes on a degenerate pattern.

As is obvious to those skilled in the digital projection art, the optical performance provided by a LCD based electronic projection system is, in large part, defined by the characteristics of the LCDs themselves and by the polarization optics that support LCD projection. The performance of polarization separation optics, such as polarization beamsplitters, pre-polarizers, and polarizer/analyzer components is of particular importance for obtaining high contrast ratios. The precise manner in which these polarization optical components are combined within a modulation optical system of a projection display can also have significant impact on the final resultant contrast.

The most common conventional polarization beamsplitter solution, which is used in many projection systems, is the traditional MacNeille prism, disclosed in U.S. Pat. No. 2,403,731. This device has been shown to provide a good extinction ratio (on the order of 300:1). However, this standard prism operates well only with incident light over a limited range of angles (a few degrees). Because the Mac-Neille prism design provides good extinction ratio for one polarization state only, a design using this device must effectively discard half of the incoming light when this light is from an unpolarized white light source, such as from a xenon or metal halide arc lamp.

Conventional glass polarization beamsplitter design, based on the MacNeille design, has other limitations beyond the limited angular response, including fabrication or thermally induced stress birefringence. These effects, which can degrade the polarization contrast performance, may be acceptable for mid range electronic projection applications, but are not tolerable for cinema projection applications. The thermal stress problem has been improved upon, with the use of a more suitable low photo-elasticity optical glass, disclosed in U.S. Pat. No. 5,969,861 (Ueda et al.), which was specially designed for use in polarization components. Unfortunately, high fabrication costs and uncertain availability limit the utility of this solution. As a result of these problems, the conventional MacNeille based glass beamsplitter design, which works for low to mid-range electronic projection systems, operating at 500–5,000 lumens with approximately 800:1 contrast, falls short for digital cinema projection.

Other polarization beamsplitter technologies have been proposed to meet the needs of a LCD based digital cinema projection system, such as the bi-directional total internal reflection beamsplitter disclosed in U.S. Pat. No. 5,912,762 (Li et al.) and liquid-filled beamsplitters (see U.S. Pat. No. 5,844,722 (Stephens et al.)). However, in recent years, successful LCD based projectors have been built around wire grid polarizers. Wire grid polarizers have been in existence for many years, and were primarily used in radio-frequency and far infrared optical applications. Use of wire grid polarizers with visible spectrum light has been limited, largely due to constraints of device performance or manufacture. For example, U.S. Pat. No. 5,383,053 (Hegg et al.) discloses use of a wire grid beamsplitter in a virtual image display apparatus, which has high light efficiency but very low contrast (6.3:1). A second wire grid polarizer for the visible spectrum is disclosed in U.S. Pat. No. 5,748,368 (Tamada). While the device discussed by Tamada provides polarization separation, the contrast ratio is inadequate for cinematic projection and the design is inherently limited to rather narrow wavelength bands.

Recently, as is disclosed in U.S. Pat. No. 6,122,103 (Perkins et al.); U.S. Pat. No. 6,243,199 (Hansen et al.); and U.S. Pat. No. 6,288,840 (Perkins et al.), high quality wire grid polarizers and beamsplitters have been developed for broadband use in the visible spectrum. These new devices are commercially available from Moxtek Inc. of Orem, Utah. While existing wire grid polarizers, including the devices described in U.S. Pat. Nos. 6,122,103 and 6,243,199 may not exhibit all of the necessary performance characteristics needed for obtaining the high contrast required for digital cinema projection, these devices do have a number of advantages. When compared against standard polarizers, wire grid polarization devices exhibit relatively high extinction ratios and high efficiency. Additionally, the contrast performance of these wire grid devices also has broader angular acceptance (NA or numerical aperture) and more robust thermal performance with less opportunity for thermally induced stress bireftingence than standard polarization devices. Furthermore, wire grid polarizers themselves are more robust than are conventional absorptive polarizers relative to harsh environmental conditions, such as light intensity, temperature, and vibration. While generally these commercially available wire grid devices perform well across the visible spectrum, an innate fall off in the polarization response for blue can mean that the blue channel may require additional contrast enhancement to match the red and green for demanding applications.

Wire grid polarization beamsplitter (PBS) devices have been employed within some digital projection apparatus. For example, U.S. Pat. No. 6,243,199 (Hansen et al.) discloses use of a broadband wire grid polarization beamsplitter for projection display applications. U.S. Pat. No. 6,234,634 (also to Hansen et al.) discloses a wire grid polarization beamsplitter that functions as both polarizer and analyzer in a digital image projection system. U.S. Pat. No. 6,234,634 states that very low effective F#'s can be achieved using wire grid PBS, although with some loss of contrast. Notably, U.S. Pat. No. 6,234,634 does not discuss how the angular response of the wire grid polarizers can be enhanced, nor how polarization compensation may be used in combination with wire grid devices and LCDs, to reduce light leakage and boost contrast, particularly for fast optical systems operating at low F#'s.

Of particular interest and relevance for the apparatus and methods of the present invention, it must be emphasized that individually neither the wire grid polarizer, nor the wire grid polarization beamsplitter, provide the target polarization extinction ratio performance (nominally >2,000:1) needed to achieve the desired projection system frame sequential contrast of 1,000:1 or better, particularly at small F#'s (<F/3.5). Instead, both of these components provide less than ~1,200:1 contrast under the best conditions. Significantly, performance falls off further in the blue spectrum. Therefore, to achieve the desired 2,000:1 contrast target for the optical portion of the system (excluding the LCDs), it is necessary to utilize a variety of polarization devices, including possibly wire grid polarization devices, in combination within a modulation optical system of the projection display. However, the issues of designing an optimized configuration of polarization optics, including wire grid polarizers and polarization compensators, in combination with LCDs, color optics, and projection lens, have not been completely addressed either for electronic projection in general, or for digital cinema projection in particular. Moreover, the prior art does not describe how to design a modulation optical system for a projection display using both LCDs and wire grid devices, which further has polarization compensators to boost contrast.

There are numerous examples of polarization compensators developed to enhance the polarization performance of LCDs generally, and vertically aligned LCDs particularly. In an optimized system, the compensators are designed to enhance the performance of the LCDs and of the polarization optics in combination. These compensators typically provide angularly varying birefringence, structured in a spatially variant fashion, to affect polarization states in portions (within certain spatial and angular areas) of the transiting light beam, without affecting the polarization states in other portions of the light beam. As a first example, U.S. Pat. No. 4,701,028 (Clerc et al.) discloses birefringence compensation designed for a vertically aligned LCD with restricted thickness. As another example, U.S. Pat. No. 5,039,185 (Uchida et al.) discloses a vertically aligned LCD with compensator comprising at least two uniaxial or two biaxial retarders provided between a sheet polarizer/analyzer pair. Additionally, U.S. Pat. No. 5,298,199 (Hirose et al.) discloses the use of a biaxial film compensator correcting for optical birefringence errors in the LCD, used in a package with crossed sheet polarizers, where the LCD dark state has a non-zero voltage (a bias voltage).

Compensators can be complex structures, comprising one or more layers of films, optical adhesives, and other materials. For example, U.S. Pat. No. 5,619,352 (Koch et al.) discloses compensation devices, usable with twisted nematic LCDs, where the compensators have a multi-layer construction, using combinations of A-plates, C-plates, and O-plates, as needed.

Polarization compensators can also be designed to correct for both the vertically aligned LCD and the polarization optics in combination. Most of these prior art compensator patents discussed previously, assume the LCDs are used in combination with sheet polarizers, and correct only for the LCD polarization errors. However, polarization compensators have also been explicitly developed to correct for non-uniform polarization effects from the conventional Polaroid type dye sheet polarizer. The dye sheet polarizer, developed by E. H. Land in 1929 functions by dichroism, or the polarization-selective anistropic absorption of light. Compensators for dye sheet polarizers are described in Chen et al. (J. Chen, K.-H. Kim, J.-J. Kyu, J. H. Souk, J. R. Kelly, P. J. Bos, "Optimum Film Compensation Modes for TN and VA LCDs", SID 98 Digest, pgs. 315–318.), and use a combination A-plate and C-plate construction. Similarly, U.S. Pat. No. 5,576,854 (Schmidt et al.) discloses a compensator constructed for use in projector apparatus using an LCD with the conventional MacNeille prism type polarization beamsplitter. This compensator comprises a ¼ wave plate for compensating the prism and an additional 0.02 λ's compensation for the inherent LCD residual birefringence effects.

While this prior art material extensively details the design of polarization compensators used under various conditions, compensators explicitly developed and optimized for use with wire grid polarizers and vertically aligned LCDs are not disclosed in the prior art. In order to achieve high brightness levels, it is most advantageous for an optical system to have a high numerical aperture (>~0.13), so that it is able to gather incident light at larger oblique angles. The conflicting goals of maintaining high brightness and high contrast ratio present a significant design problem for polarization components. Light leakage in the OFF state must be minimal in order to achieve high contrast levels. Yet, light leakage is most pronounced for incident light at the oblique angles required for achieving high brightness.

Commonly-assigned U.S. Pat. No. 6,585,378 (Kurtz et al.) discloses a projection system employing wire grid polarizers and polarization beamsplitters. This disclosure also acknowledges the potential need for polarization compensation in optical systems having wire grid polarization beamsplitters and LCDs, but does not teach the design thereof. However, as is disclosed in commonly-assigned U.S. Patent Application Publication No. 2003/0128320, polarization compensators have been developed and optimized for wire grid polarizers and polarization beamsplitters. In particular, this application describes compensators designed for the wire grid devices, as well as compensators for wire grid devices that also work with vertically aligned LCDs and with compensators for vertically aligned LCDs. It has been shown that a modulation optical system comprising wire grid polarizers, a wire grid polarization beamsplitter, a vertically aligned LCD, and a customized polarization compensator, can provide polarization contrast in excess of the 1,000:1 target across a wide range of incident angles (small F's).

This application is a Continuation-in-Part of U.S. patent application Ser. No. 10/163,228 by Silverstein et al. which introduces the concept of in-plane rotation of a wire grid polarization beamsplitter by a fixed amount as a means for polarization compensation. As this rotation enables the wire grid polarization beamsplitter to effectively substitute for an A-plate compensator by providing an equivalent in-plane retardance, the polarization compensator needed by the projector can be simplified. In particular, the fabrication of standard polarization compensators used in such a system can be difficult, as, depending on the compensator design, specific values and orientations of retardance are required, and are assembled from a combination of existing materials. Typically these materials are thin film sheets, such as polycarbonate or acetate, whose optical retardance depends both on material properties and film fabrication methods. Compensators can then be assembled by stacking an appropriate combination of these films between glass plates, with intervening layers of optical adhesive to provide optical index matching. The assembled compensator must be free from both dirt and bubbles, and provide a consistent spatially uniform retardance while under a large heat (light) load. Alternately, a compensation layer with a nominal target retardance can be spun coated directly on a glass substrate, thereby potentially simplifying the construction of the compensator device. However, the construction of compensators that require multiple retardation layers with different properties can still be difficult. Furthermore, the optimum retardance required to correct for the inherent residual birefringence (such as the 0.02 λ's mentioned previously) can vary significantly from device to device. Ideally, but likely impractically, this implies that to maximize contrast from device to device would require matching each LCD with an appropriately optimized compensator. Polarization compensators can also be fabricated by alternate technologies, including crystalline sheets, optical thin films, liquid crystal polymers, and sub-wavelength dielectric form birefringent structures. Nonetheless, providing the equivalent of the A-plate portion of a compensator by means of wire grid polarization beamsplitter polarization rotation can be a significant improvement and cost savings.

In that case, there is then a need to provide a mechanical housing that holds the wire grid polarization beamsplitter in proximity to a liquid crystal display and other nearby polarization components, which further provides for the controlled in-plane rotation of the wire grid polarization beamsplitter, without disturbing other key aspects of its alignment or operation. Commonly-assigned copending U.S. patent application Ser. No. 10/624,346 by Ehrne et al. provides a housing and method for mounting polarization components and a reflective LCD spatial light modulator. In particular, this application provides a mechanical housing or frame that holds a wire grid polarization beamsplitter in position relative to an LCD in a high lumen, high heat load projector, while minimizing thermal distortion and stress birefringence. Among key design considerations discussed in this application are the mounting a wire grid polarizing beamsplitter while maintaining the surface of this component at an accurate 45 degree orientation relative to both the surface of the spatial light modulator and the surface of an analyzer. A related problem that must be resolved in electronic projection apparatus design is alignment of the spatial light modulator itself relative both to the wire grid polarizing beamsplitter and to the projection optical path. Maintaining precision alignment without the negative effects of thermal drift is a key design goal for high-end electronic projection apparatus. This application however does not provide means to mechanically rotate the wire grid polarization beamsplitter by a fixed amount to enable polarization compensation, allowing in-plane rotation without causing undesired constraints, stresses or movements that could effect the wire gird polarization beamsplitter, such as under a high heat load or during the transition from room ambient to high heat load operation.

Other documents in the art, such as an article in the SID 02 *Digest* entitled "The Mechanical-Optical Properties of Wire-Grid Type Polarizer in Projection Display System" by G. H. Ho et al., which presents some of the key design considerations for deploying wire grid polarizer components in imaging apparatus using reflective LCD spatial light modulators, do not disclose the need or the mechanical means for rotating a wire grid polarization beamsplitter in-plane. Likewise, U.S. Patent Application Publication No. 2003/0117708 (Kane), which discloses a sealed enclosure comprising of a wire grid polarizing beamsplitter, a spatial light modulator, and a projection lens having the interior space filled with a inert gas or vacuum, also does not consider the need or mechanism for providing controlled in-plane rotation of wire grid polarization beamsplitter as part of a housing design.

Therefore, as can be seen, there is a need for a mechanical housing of an LCD based electronic projector in which controlled in-plane rotation of a wire grid polarization beamsplitter is provided, so as to enable an alternate polarization compensation means.

SUMMARY OF THE INVENTION

It is an object of the present invention to provide an apparatus and technique for mounting spatial light modulator and supporting polarization components that is mechanically robust, that allows thermal expansion without degrading image quality, that allows straightforward alignment of components in the light modulation path, and that allows controlled rotation of a wire grid polarization beamsplitter by a fixed amount.

With the above object in mind, the present invention provides a housing for mounting a beamsplitter and a spatial light modulator in alignment with an output optical path, comprising:

(a) a front plate having an opening for admitting incident illumination provided along an illumination axis;
(b) a modulator mounting plate, spaced apart from and substantially parallel to the front plate, for mounting the spatial light modulator in the optical output path of the illumination axis;
(c) first and second polarizer support plates, spaced apart from each other and extending between the front plate and the modulator mounting plate;
respective facing inner surfaces of the first and second support plates providing support features for supporting the beamsplitter between the facing inner surfaces within a fixed plane relative to the illumination axis;
the support features being configured to allow rotation of the beamsplitter, over a range of angles, within the fixed plane; and
the beamsplitter being extended between and substantially normal to the facing inner surfaces, the surface of the beamsplitter maintained at a fixed angle with respect to the surface of the spatial light modulator on the modulator mounting plate, the fixed angle defining an output optical axis and working distance along the output optical path.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
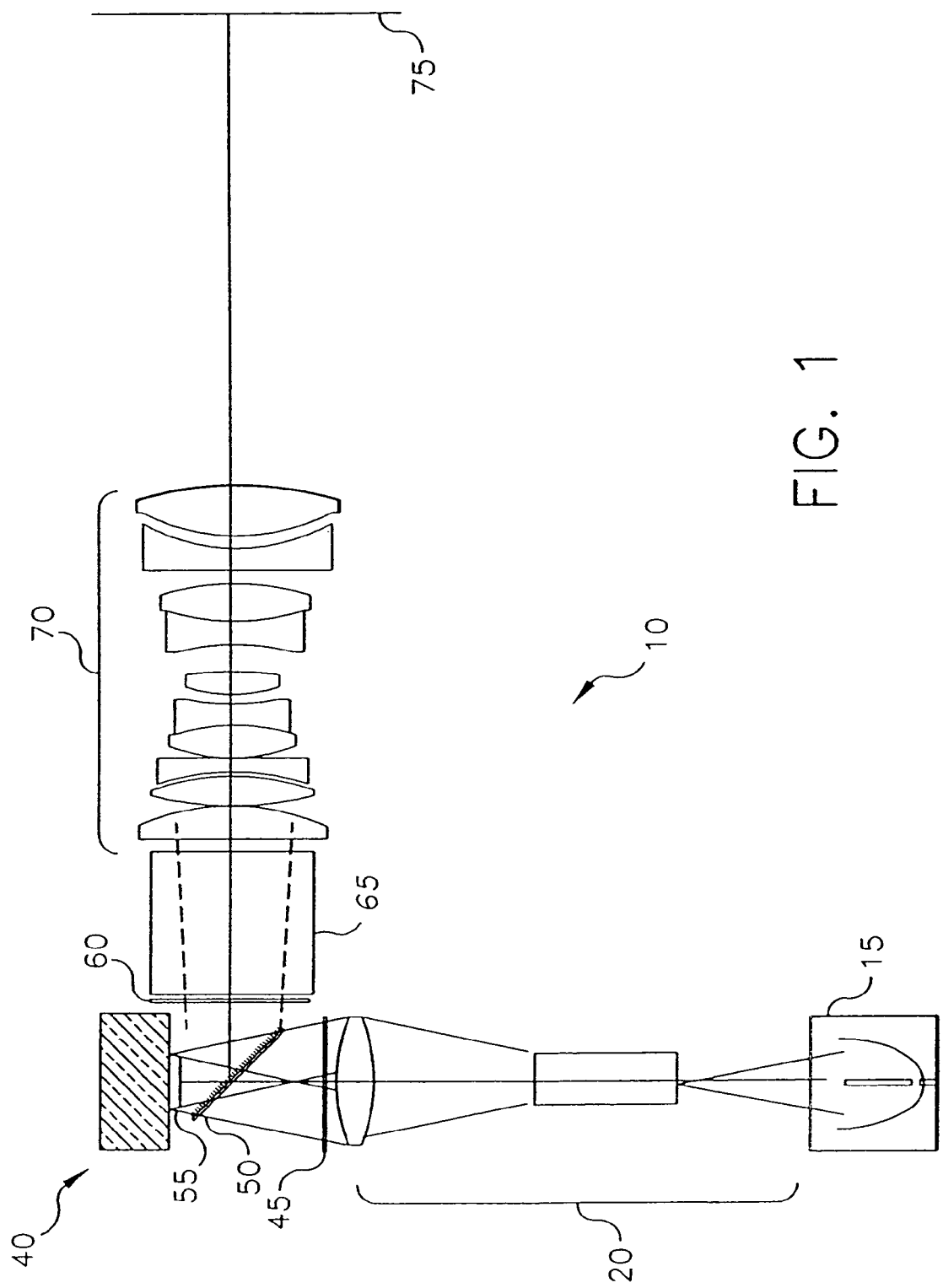
FIG. 1 is a schematic view showing an arrangement of optical components in a projection apparatus.

Referring to FIG. 1, there is shown in schematic form the arrangement of optical components in a digital projection apparatus 10, as described in commonly-assigned U.S. Pat. No. 6,585,378 (Kurtz et al.) Illumination optics 20 and pre-polarizer 45 precondition light from a light source 15 to provide illumination that is essentially uniformized and polarized. Illumination optics 20 includes uniformizing optics, such as an integrating bar or a fly's eye integrator assembly, and condensing relay optics assembly. This light is subsequently polarized by pre-polarizer 45, with light of the desired polarization state directed towards the polarization beamsplitter, while the rejected alternate polarization state light nominally reflects back towards the light source. Pre-polarizer 45 is part of modulation optical system 40, which also comprises a wire grid polarization beamsplitter 50, a polarization altering spatial light modulator 55, and a polarization analyzer 60. Nominally, wire grid polarization beamsplitter 50 transmits the incident light having the preferred polarization state, while reflecting residual incident light having the alternate polarization state out of the system. Incident light is modulated by spatial light modulator 55, which is nominally a liquid crystal display (LCD), to encode a two-dimensional image onto the light, which is then reflected as a modulated light beam. Wire grid polarization beamsplitter 50 reflects light from the modulated light beam having one polarization state, and transmits the light having the alternate polarization state. Projection optics 70 then directs the reflected modulated light beam onto a display surface 75, which is nominally a projection screen. Typically, the visible light emitted by the light source 15 is split into three color channels (red, green, blue), where the light in each channel interacts with its own modulation optical system 40, including its own spatial light modulator 55. These channels can be recombined for projection to the display surface 75 by a recombination prism 65.

Figure 2:
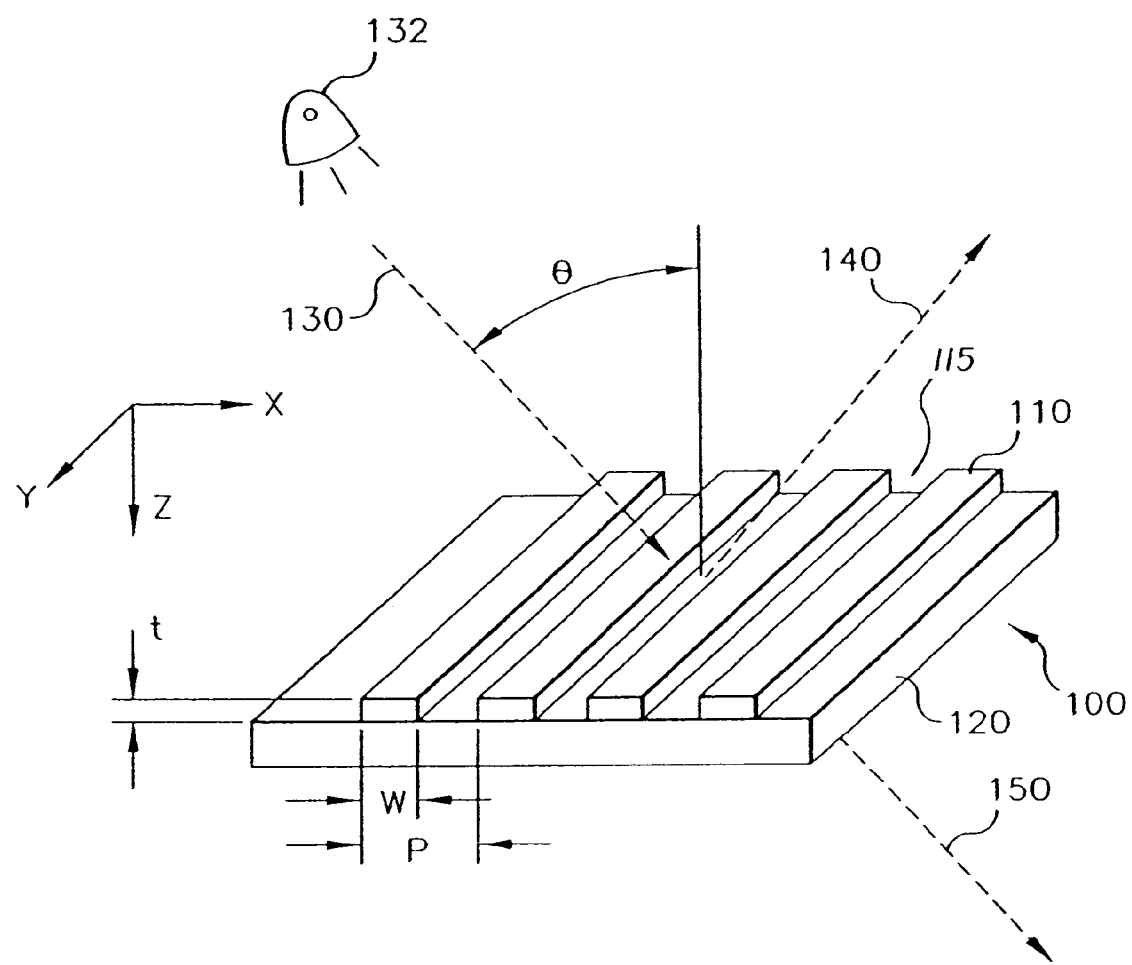
FIG. 2 is a perspective view of a prior art wire grid polarizer.

The design of digital projection apparatus 10 and modulation optical system 40 both can be better understood from a deeper discussion of the properties of the wire grid polarizers used within these systems. FIG. 2 illustrates a basic prior art wire grid polarizer and defines terms that will be used in a series of illustrative examples of the prior art and the present invention. The wire grid polarizer 100 is comprised of a multiplicity of parallel conductive elements (wires) 110 and grooves 115 supported by a dielectric substrate 120. This device is characterized by the grating spacing or pitch or period of the conductors, designated (p); the width of the individual conductors, designated (w); and the thickness of the conductors, designated (t). A wire grid polarizer uses sub-wavelength structures, such that the pitch (p), conductor or wire width (w), and the conductor or wire thickness (t) are all less than the wavelength of incident light ($\lambda$). While the wire thickness (t) can actually exceed the wavelength, for most designs, that is not the case. A beam of light 130 produced by a light source 132 is incident on the wire grid polarizer 100 at an angle $\theta$ from normal, with the plane of incidence orthogonal to the conductive elements. The wire grid polarizer 100 divides this beam into specular non-diffracted outgoing light beams; reflected light beam 140 and transmitted light beam 150. The definitions for S and P polarization used are that S polarized light is light with its polarization vector parallel to the conductive elements, while P polarized light has its polarization vector orthogonal to the conductive elements. In general, a wire grid polarizer will reflect light with its electric field vector parallel ("S" polarization) to the grid, and transmit light with its electric field vector perpendicular ("P" polarization) to the grid. Wire grid polarizer 100 is a somewhat unusual polarization device, in that it is an E-type polarizer in transmission (transmits the extraordinary ray) and O-type polarizer in reflection (reflects the ordinary ray).

When such a device is used at normal incidence ($\theta=0$ degrees), the reflected light beam 140 is generally redirected towards the light source 132, and the device is referred to as a polarizer. However, when such a device is used at non-normal incidence (typically $30° < \theta < 60°$), the illuminating beam of light 130, the reflected light beam 140, and the transmitted light beam 150 follow distinct separable paths, and the device is referred to as a polarization beamsplitter. The detailed design of a wire grid device, relative to wire pitch (p), wire width (w), wire duty cycle (w/p), and wire thickness (t), may be optimized differently for use as a polarizer or a polarization beamsplitter. It should be understood that both digital projection apparatus 10 and modulation optical system 40, when designed with polarization modifying spatial light modulators, may use polarization analyzers and polarization beamsplitters other than wire grid type devices. For example, the polarization beamsplitter may be a MacNeille type glass prism, or the polarizer may be either a dye/polymer based sheet polarizer. However, for this discussion, the polarization beamsplitter 50, pre-polarizer 45, and polarization analyzer 60 are all generally assumed to be wire grid devices, although that is not required for all configurations for the projector.

Figure 3:
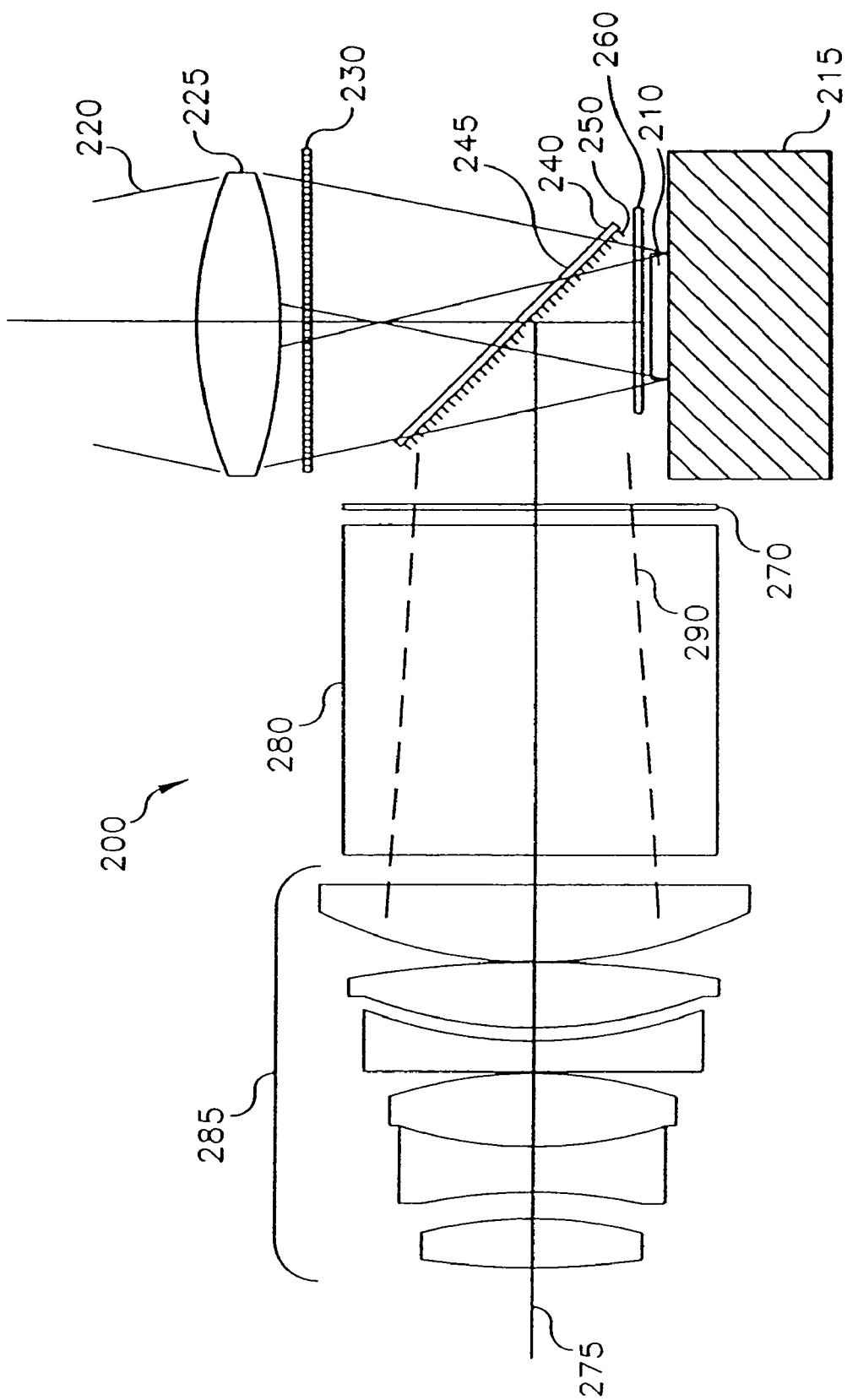
FIG. 3 is a cross sectional view showing a modulation optical system which includes a wire grid polarization beamsplitter.

The preferred spatial relationships of these polarizers, as used in a modulation optical system 200, are illustrated in FIG. 3. Modulation optical system 200 is an expanded and more detailed version of the modulation optical system 40 of FIG. 1. The basic structure and operation of modulation optical system 200 is described in the previously cited commonly-assigned U.S. Pat. No. 6,585,378. Modulation optical system 200, which is a portion of an electronic projection system (or a printer system), comprises an incoming illumination light beam 220, which is focused through pre-polarizer 230, wire grid polarization beamsplitter 240, and compensator 260, and onto spatial light modulator 210 (the LCD) by a condenser 225. Modulated image-bearing light beam 290 is reflected from the surface of spatial light modulator 210, transmitted through compensator 260, reflected off of wire grid polarization beamsplitter 240, and is then transmitted through polarization analyzer 270. After exiting modulation optical system 200, modulation image-bearing light beam 290 follows along optical axis 275, and is transmitted through recombination prism 280 and projection lens 285 on its way to the screen (or to a photo-sensitive media). Again, pre-polarizer 230 and polarization analyzer 270 are assumed to both be wire grid polarization devices. A full color projection system would employ one modulation optical system 200 per color (red, green, and blue), with the color beams re-assembled through the recombination prism 280. Condensor 225, which may comprise several lens elements, is part of a more extensive illumination system which transforms the source light into a rectangularly shaped region of nominally uniform light which nominally fills the active area of spatial light modulator 210.

In a modulation optical system 200 utilizing a prior art wire grid polarization beamsplitter, the wire grid polarization beamsplitter 240 consists of a dielectric substrate 245 with sub-wavelength wires 250 located on one surface (the scale of the wires is greatly exaggerated). Wire grid polarization beamsplitter 240 is disposed for reflection into projection lens system 285, thereby avoiding the astigmatism and coma aberrations induced by transmission through a tilted plate. Most simply, compensator 260 is a waveplate which provides a small amount of retardance needed to compensate for geometrical imperfections and birefringence effects which originate at the surface of spatial light modulator 210. For example, as discussed in U.S. Pat. No. 5,576,854 (Schmidt et al.), compensator 260 may provide 0.02 $\lambda$'s of retardance (A-plate) to correct for polarization errors caused by residual geometrical imperfections of the LCD polarizing layer and residual thermally induced birefringence within the counter electrode substrate within the LCD package. In less demanding applications than digital cinema, compensator 260 may prove optional.

The construction of modulation optical system 200, as used for digital cinema, is defined both by the system specifications and the limitations of the available wire grid polarizing devices. In particular, digital cinema requires the electronic projector to provide high frame sequential system contrast (1,000:1 or better). To accomplish this, the polarization optical components, excluding spatial light modulator 210 (the LCD) of modulation optical system 200 must provide a total optical system contrast (Cs) of ~2,000:1. The actual target contrast for the polarization optics of course depends on the performance of the LCDs. Thus, if the LCDs provide only ~1,500:1 contrast, then the polarization optics must provide ~3,000:1 contrast. For digital cinema, LCDs with vertically aligned (VA) molecules are preferred due to their high innate contrast. Notably, the contrast performance of both the LCDs and the polarization optics typically decrease with increasing numerical aperture of the incident beam. Unfortunately, with today's technologies it is not sufficient to use just a single wire grid polarization beamsplitter 240 by itself in order to meet the 2,000:1 target contrast for the polarization optics. For this reason, modulation optical system 200 also uses a wire grid pre-polarizer 230 and a wire grid polarization analyzer 270 to provide the target polarization performance.

The construction and operation of modulation optical system 200 can be understood in yet greater detail, relative to its polarization performance. Preferably, pre-polarizer 230 is oriented to transmit "P" polarized light into the modulation optical system. Wire grid polarization beamsplitter 240 is oriented with its sub-wavelength wire pattern oriented nominally parallel to the sub-wavelength wires of pre-polarizer 230 (that is, the two devices are not crossed). Thus, the transmitted "P" light is further modified (contrast enhanced) by transmission through the wire grid polarization beamsplitter 240. The transmitted light beam then passes through compensator 260 and encounters spatial light modulator 210, which is nominally a reflective LCD, which modifies the polarization state of the incident light on a pixel to pixel basis according to the applied control voltages. Intermediate code values, between white and black, reduce the amount of "On" state and increase the amount of "Off" state light. The "On" state light, which has been polarization rotated, is in the "S" polarization state relative to the wire grid polarization beamsplitter 240. Thus, the "S" state light reflects off the wire grid polarization beamsplitter 240, is subsequently transmitted through polarization analyzer 270, and directed to the screen by a projection lens 285. The overall contrast (Cs) for modulation optical system 200 (ignoring the LCD and compensator contributions) can be approximated by:

$$1/Cs = 1/(C_{T1} * C_{T2}) + 1/(C_{R2} * C_{T3}),$$

where $C_{T1}$ is the transmitted contrast of the wire grid pre-polarizer 230, $C_{T2}$ and $C_{R2}$ are transmitted and reflected contrast ratios for the wire grid polarization beamsplitter 240, and $C_{T3}$ is the transmitted contrast for the wire grid polarization analyzer 270. In this system, the overall contrast is largely determined by the low reflected contrast ratio $C_{R2}$ for "S" polarization state light off of wire grid polarization beamsplitter 240. The analyzer contrast $C_{T3}$ needs to be quite high to compensate for the low $C_{R2}$ values (~30:1). Whereas the transmitted contrasts $C_{T1}$ and $C_{T2}$ do not need to be particularly high, provided that the respective contrast values are reasonably uniform over the spectrum. Polarization analyzer 270 is oriented so that the "On" state light, which reflects off the wire grid polarization beamsplitter 240 and has "S" polarization relative to the wire grid polarization beamsplitter 240, sees this same light as "P" state light relative to its own structure. Polarization analyzer 270 therefore removes any alternate polarization leakage light accompanying the desired "On" state beam. As an example, for green light at 550 nm, the combination of wire grid polarization beamsplitter 240 and wire grid pre-polarizer 230 provide an on screen frame sequential optical contrast ratio of only ~25:1. However, when these polarizers are complemented with wire grid polarization analyzer 270, the theoretical overall system contrast Cs is boosted to ~2,900:1.

Modulation optical system 200 is best constructed with wire grid polarization beamsplitter 240 oriented with the surface with the sub-wavelength wires 250 facing towards the spatial light modulator 210, rather than towards the illumination optics (condensor 225) and light source (see FIG. 3). While the overall contrast (Cs) is ~2,900:1 when this orientation is used, the net contrast drops precipitously to ~250:1 when the alternate orientation (wires on the surface towards the light source) is used. (Note: spatial light modulator 210 (LCD) is replaced by a mirror and a quarter wave plate for this test). This fall off in contrast is caused by stress birefringence in the glass substrate, which can be due to the innate qualities of the glass itself, or from thermally induced stress birefringence from light absorption. In the preferred orientation, with glass substrate 245 positioned with the sub wavelength wires 250 facing towards the spatial light modulator 210, the modulated image bearing light beam 290 reflects from the wires without encountering the substrate and any stress birefringence within it, thus maintaining the high contrast. Modulation optical system 200 also provides the highest contrast and light efficiency when the sub-wavelength wires 250 of wire grid polarization beamsplitter 240 are oriented "vertically" ("into the page", as shown), rather than "horizontally" (within the plane of the page).

In order to build a digital cinema projector it is necessary to simultaneously maximize luminance (10,000–15,000 lumens) and contrast (1,000:1+) with a system illuminating 35–55 ft. wide screens, while dealing with the limitations of the various optics, wire grid devices and LCDs. Luminance can be maximized by increasing the acceptance angle (numerical aperture) of light incident at the wire grid polarization beamsplitter and the LCD. Modeling suggests that an LCD based digital cinema projector will need to operate below F/3.0 to meet the screen luminance targets, with systems speeds of F/2.0 to F/2.3 being potentially required. However, the wider angles of source light incident at wire grid polarization beamsplitter, will increase the leakage light from other polarization states, and thus reduce the available contrast. Measurements have shown that the contrast for modulation optical system 200 (including wire grid pre-polarizer 230, wire grid polarization beamsplitter 240, a VA LCD, and a wire grid polarization analyzer 270) at ~F/2.3 is only ~500:1, when the system is assembled without the polarization compensators.

Figure 4:
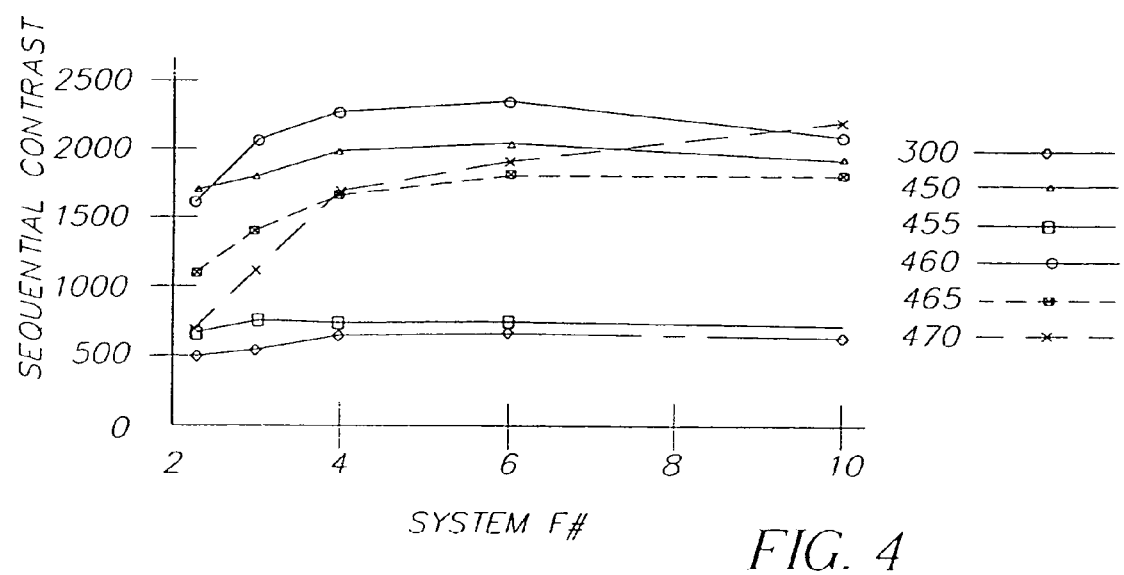
FIG. 4 is a series of plots showing the relationship of contrast to F# for a modulation optical system which includes both a wire grid polarization beamsplitter and a LCD, as measured under various cases of polarization compensation.

In particular, as shown in FIG. 4, where the uncompensated system contrast 300 is plotted versus F#, the measured contrast at F/2.3 for modulation optical system 200 assembled with a VA LCD used for spatial light modulator 210, but without a compensator 260, is only ~490:1. Note that the illumination F# was changed, while the collection F# was held constant at F/2.3. If both had been changed identically, all the curves of FIG. 4 would show much more dramatic increases of contrast vs. F#, particularly above F/4. Furthermore, the uncompensated system contrast 300, as measured with this one particular VA-LCD (device "A"), remains low (only ~630:1) out to F/10.

Figure 6A:
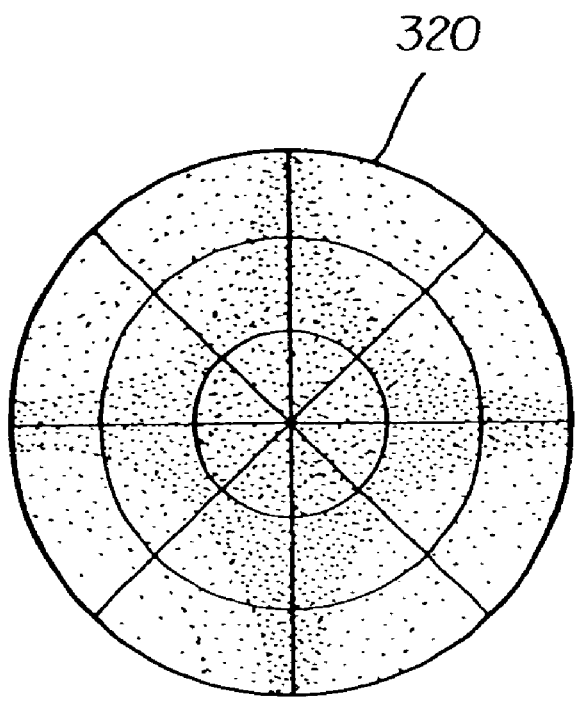
FIGS. 6a and 6b show the angular response for crossed wire grid polarizers without polarization compensation.

While the polarization contrast can be degraded by numerous contributors within modulation optical system 200, this contrast loss can also be evidenced in several ways. FIG. 6a illustrates the polarization contrast profile for crossed polarizers, visible in angular space as an iso-contrast plot, and known as the "iron cross." The iron cross pattern 320 demonstrates peak extinction in directions parallel and perpendicular to the grid of the analyzer, and diminished extinction for the skew rays and oblique rays in the four off-axis quadrants. As the wire grid polarization beamsplitter has superior angular performance when compared to most existing polarizers, these devices have been generally considered to not have a skew ray problem, and therefore to not require further polarization compensation. This is in part because the wire grid polarization beams splitter functions as an O-type polarizer in reflection and an E-type polarizer in transmission, and therefore is partially self compensating when used in both transmission and reflection as in modulation optical system 200.

Figure 6B:
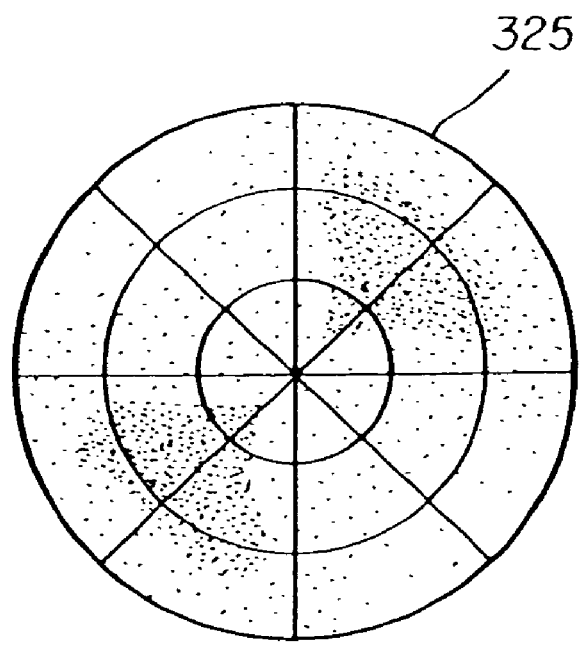

The "iron cross" illustration of FIG. 6a also represents the nominal polarization response of an ideal VA LCD, as seen through crossed polarizers, assuming it has a negligible internal tilt angle from the vertical, relative to molecular alignment. Unfortunately, contrast can also be degraded by various subtle effects within the VA-LCDs, such large tilt angles, OFF state bias voltages, thermally induced stresses, and large incident angles (large NA's). These effects can cause the contrast to be generally reduced while the iron cross pattern 320 is retained, or cause the iron cross pattern 320 to be deformed into another extinction pattern (such as the "baseball" pattern 325 shown in FIG. 6b). For example, just 3–4 nm of residual XY retardance within a VA LCD can cause the device to output the baseball pattern 325 rather than an iron cross pattern 320. As the iso-contrast departs more and more from the iron cross pattern, the total integrated contrast typically drops as well. Contrast degradation from the wire grid polarization beamsplitter 240, from effects such as wire surface orientation, wire rotation, and large incident angles, can also degrade the iron cross pattern 320 in similar ways.

Figure 5A:
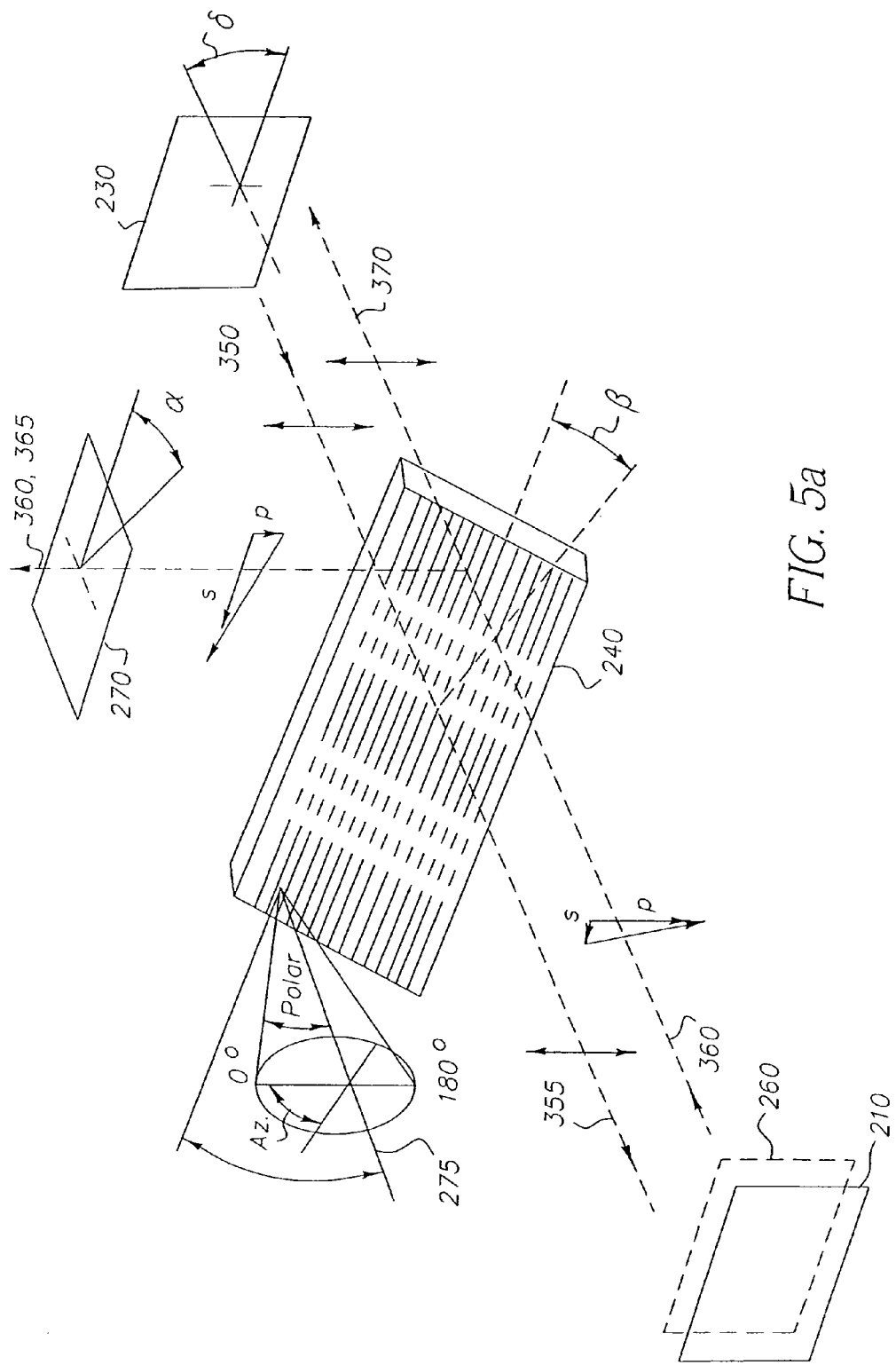
FIG. 5a shows the geometry of incident light relative to the wire grid polarization beamsplitter and a LCD within a modulation optical system, illustrating both polarization states and the local beam geometry.

This can be better understood by considering how polarized light traverses modulation optical system 200. FIG. 5a, shows a perspective view representing light polarization states for light reflected by and transmitted through wire grid polarization beamsplitter 240 within the modulation optical system, for a portion of LCD 210. A pre-polarized beam 350 is transmitted through wire grid polarization beamsplitter 240. As shown in FIG. 5a, the electric field polarization of transmitted beam 355 is on a vector perpendicular to the wire grid of wire grid polarization beamsplitter 240. A returning modulated beam 360 is reflected from the pixel on LCD 210, where the "S" polarized light is the image data, and the "P" polarized light is to be rejected. Ideally, wire grid polarization beamsplitter 240 transmits 100% of the unwanted "p" light as a modulated transmitted light 370. However, a small leakage light 365 is reflected from wire grid polarization beamsplitter 240 and accompanies "s" modulated beam 360, causing reduced contrast (ratio of "s" to "p"). The magnitude of the leakage light 365 is further reduced by the wire grid polarization analyzer 270. Relative to the modulated beam 360, wire grid beamsplitter acts as a pre-polarizer in transmission and a polarization analyzer in reflection, in a sense comprising the typical crossed polarizer configuration.

Figure 5B:
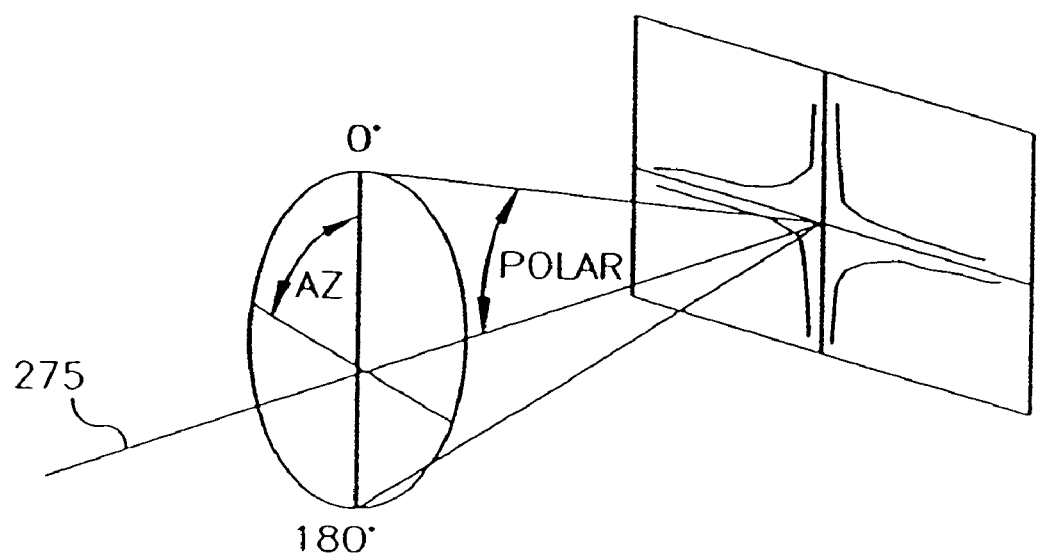
FIG. 5b illustrates the geometry of normally incident light relative to the polarization states of crossed polarizers.

While some loss of polarization contrast does occur with on axis collimated light, the effects are more dramatic for oblique and skew rays. To better understand this, FIG. 5a includes an illustration of the beam geometry for a large NA non-specular beam incident on a 45° tilted surface of wire grid polarization beamsplitter 240, while FIG. 5b shows the geometry for a similar non-specular beam incident normal to a surface (such as the LCD 210, pre-polarizer 230 or polarization analyzer 270). For the normally incident case, the incoming beam is described by an azimuthal sweep of 0–180°, while the polar sweep of angles is limited (0–15° for F/2.0). The oblique rays are those rays that fall in the four quadrants outside the axes (azimuthal angles 0° and 180°, 90° and 270°) defined by the crossed polarizers, and which lie in planes which contain the local optical axis 275. The skew rays are the rays that lie in planes that do not contain the local optical axis 275. For the case of incidence to the 45° tilted surface, the incoming beam is again defined by an azimuthal sweep of 0–180°, while the polar sweep of angles covers ~0–150 relative to the optical axis, or a sweep of ~30–60° relative to the wire grid surface. It is these oblique and skew rays which account for the reduced contrast observed in the four quadrants of iron cross pattern 320. For example, peak contrast along the axes can exceed 1,000:1, while contrast in the four quadrants located 45° off the crossed coordinate axes falls off to 300:1 or less.

As noted previously, modulation optical system 200, which partially comprises a wire grid pre-polarizer 230, a wire grid polarization beamsplitter 240, a vertically aligned LCD 210, and a wire grid polarization analyzer 270, nominally provides only ~500:1 contrast in the green at F/2.3, which is below specification. However, as one solution, the system contrast can be enhanced, to meet and exceed specification, through the use of the appropriate compensators.

As discussed in commonly assigned U.S. Patent Application Publication No. 2003/0128320, polarization compensators can be specifically designed to enhance the polarization angular response of both the wire grid polarizers and the wire grid polarization beamsplitters. As discussed in that application, modeling of a typical visible wavelength wire grid polarizer, using the rigorous coupled wave analysis (RCWA) methodology shows a significant increase in light transmission versus angle. These wire grid polarizers were modeled as aluminum wire structures, deposited on Corning glass 1737F, with a wire pitch of 144 nm (~$\lambda$/4), a wire duty cycle of 0.45, and a wire height of 130 nm. In the green wavelength band (550 nm), the transmission at 20 deg. (F/1.5) and a 45 deg. azimuthal angle (corresponding to the off axis quadrants the iron cross pattern 320 of FIG. 6a) is 2.5× larger than it is at a polar angle of 0 deg. At even larger polar angles (40 deg.) the transmission (leakage light) can be ~10× larger than it is on axis. As contrast is approximately inversely proportional to the transmission for crossed polarizers, such increases in transmitted light (light leakage) can cause huge changes in system contrast.

As further discussed in U.S. Patent Application Publication No. 2003/0128320, exemplary polarization compensators were designed to enhance the performance for both crossed wire grid polarizers (pre-polarizer 230 and polarization analyzer 270 of FIG. 3) and for the wire grid polarization beamsplitter 240. In particular, exemplary polarization compensators were designed to optimize the combined transmission performance versus angle for the wire grid polarization beamsplitter 240 oriented at 45°. One such compensator was designed as a combination of two specific birefringent films, a +90 nm A-plate and a +320 nm C-plate. With this compensator, the transmission of the Off state light (leakage light) at azimuthal angles of 45 deg. was reduced by ~2× or more, throughout a range of large polar angles spanning 15° to 30°, as compared to the un-compensated wire grid polarization beamsplitter. Meanwhile, the on-axis transmission was unaffected (not degraded), as the compensated and uncompensated values remained the same. Using this compensator effectively alters the iron cross pattern 320 of FIG. 6a to be "black" (high contrast light extinction) over a larger angular range.

This compensator is represented by compensator 260 in modulation optical system 200 of FIG. 3, and is located between wire grid polarization beamsplitter 240 and liquid crystal spatial light modulator 210. This is the optimal location for this compensator within modulation optical system 200.

It should be understood that the compensators, whether for the wire grid polarizers, or for the wire grid polarization beamsplitters, can be designed any number of ways. For example, a single biaxial film can be used to replace the combination of A-plate and C-plate. Likewise, the compensators can be designed in reverse order, with a C-plate encountered before the A-plate. However, when the order is switched, the designed birefringence values likely change. It is also understood that additional A-plate and/or C-plate and/or biaxial films can be added to a prior A-plate and C-plate compensator design. The compensators may be constructed with their birefringent films sandwiched between two glass substrates, with optical matching adhesives or gels holding the elements together. In that case, any glass to air surfaces should be AR coated.

Similarly, as discussed in U.S. Patent Application Publication No. 2003/0128320, the overall contrast performance of modulation optical system 200 of FIG. 3 can be enhanced by providing polarization compensators which enhance the performance of the LCDs as seen through the wire grid polarization beamsplitter. This is similar in concept to the prior art example of U.S. Pat. No. 5,576,854 (Schmidt et al.), where a compensator is described which optimizes for the VA LCD working in combination with a MacNeille beamsplitter. As disclosed in that patent, a 0.27 λ compensator is used, where 0.25 λ's compensate for the MacNeille prism and 0.02λ's for residual stress birefringence in the counter electrode substrate of the LCD. Thus, for the current circumstance, where the vertically aligned LCD is combined with a wire grid polarization beamsplitter, the 0.25λ's retardance used to compensate for the MacNeille type prism is not required. However, the residual 0.02λ's retardance (~11 nm XY), which is provided as an A-plate, can still be useful to correct to stress birefringence within the VA LCD, even when a wire grid beamsplitter is used.

The design of polarization compensators for use with VA-LCDs within a modulation optical system 200 for digital cinema was also considered in the prior cited U.S. Patent Application Publication No. 2003/0128320. It was noted that modulation optical system 200 places the VA LCD in an unusually fast optical system (approx. <F/3.0). In that case, a negative C-plate may be used to correct the viewing angle dependence of the liquid crystal. This negative C-plate should have same amount of Z retardation as the VA-LCD, which may typically be ~160–300 nm. Thus, in this case, the preferred compensator for reflective VA LCD's, used in fast beams in combination with a wire grid polarization beamsplitter, comprises both a negative C-plate (−233 nm retardance for example) and a rotatable positive A-plate (~11 nm retardance for example).

Again, when an ideal, or near ideal, VA-LCD is viewed through crossed polarizers in the Off State, the iso-contrast shows an "iron cross" pattern 320, similar to that of FIG. 6a. This pattern indicates that there is minimal light along the optical axis (center of the spherical pattern) and along the directions parallel or perpendicular to the transmission axis of the crossed polarizers, but that there is leakage light can be expected in the four quadrants. However, the modeled polarization extinction with F/2.3 illumination at an azimuthal angle of 45° for an un-compensated ideal VA-LCD located between crossed polarizers, exceeds ~1,000:1 out to a polar angle of only ~3.5°. By comparison, the same VA-LCD modeled with a proper C-plate compensator (−233 nm retardance) to boost contrast for fast light beams, was modeled to have contrast levels of 1,000:1 out to more than a 13° polar angle. Similar improvements can be obtained for non-ideal VA-LCDs, such as those with significant residual XY retardance (11 nm for example), which by themselves give the degenerate iso-contrast baseball pattern 325 when viewed through crossed polarizers. When such an LCD is paired with a properly designed (with a −233 nm C-plate and 11 nm A-plate for example) polarization compensator, the contrast is significantly enhanced over a wide angular range.

As was also discussed in U.S. Patent Application Publication No. 2003/0128320 the polarization compensators for the wire grid polarization beamsplitter 240 and the LCD 210 are co-located between these two components, and can be combined into one packaged compensator device (compensator 260). Moreover, an integrated compensator can be used, which includes a single C-plate where the net retardance is determined from the calculated C-plate retardances for the VA-LCD compensator and the wire grid polarization beamsplitter compensator. The net C-plate retardance may be smaller or larger, depending on the sign (positive or negatively birefringent) of the input C-plate values. In the prior examples, the C-plate compensator for the wire grid polarization beamsplitter had +320 nm retardance, while the C-plate compensator for the VA-LCD had −233 nm birefringence. Thus, when these two C-plate designs are combined, the remaining C-plate has only ~87 nm retardance. The combined compensator 260 then comprises the 11 nm A-plate for the VA LCD (0.02λ's compensation), the 87 nm C-plate, and the 90 nm A-plate for the wire grid polarization beamsplitter 240 in sequential order, with the 11 nm A-plate located closest to the LCD 210. The two A-plates cannot be simply combined, as the 11 nm A-plate needs to be rotatable, while the 90 nm A-plate has a fixed orientation relative to the sub-wavelength wires 250. All or a portion of the compensator 260 may be rotated to optimize the contrast or light efficiency or both.

Considering again FIG. 4, the XYZ compensated system contrast 450 is shown for the case of modulation optical system 200 tested with a VA-LCD and a polarization compensator 260. In this example, the VA-LCD was the same one (device "A") used to collect the data for the uncompensated system contrast 300, and the compensator 260 specifically consisted of a 180 nm C-plate (for Z) and a 12 nm A-plate (for XY). (Note: this compensator incorporates the exemplary correcting retardances for the VA-LCD only, and not the exemplary retardances for correcting the wire grid polarization beamsplitter.) As can be seen by comparing the uncompensated system contrast 300 to the XYZ compensated system contrast 450, the measured contrast at F/2.3 is improved dramatically, to ~1,670:1. Moreover, for this device "A" VA-LCD and compensator combination, the contrast is dramatically improved from F/2.3 to F/10, as it remains above 1,600:1 over the entire range.

The presence of an A-plate with the correct XY polarization compensation can be critical in achieving the required contrast performance for some LCDs. The contrast of modulation optical system 200 was measured with the device "A" VA-LCD used previously in the results shown in FIG. 4, but using a polarization compensator 260 with a C-plate with only ~220 nm of Z-rotation. In this case, as that particular VA-LCD requires ~11–12 nm of XY retardance, which wasn't provided, the resultant contrast, Z only compensated contrast 455, was marginally better at ~650:1 than the uncompensated system contrast 300 over the F# range of F/2 to F/10. However, this result is not as good as the XYZ compensated system contrast 450 which was achieved with device "A", while using the exemplary compensator with a 180 nm C-plate (Z) and a 12 nm A-plate (XY). By comparison, when the aforementioned Z-only compensator is paired with VA-LCD device "B" which naturally has iron cross behavior (that is, needs little or no XY retardance compensation), the contrast at F/2.3 exceeded 2200:1.

As can be seen, the design and construction of polarization compensators is of itself complicated, while the large variations in residual retardance in the LCDs themselves, further complicate the quest for maximized contrast. However, it has been demonstrated that the wire grid polarizers can be rotated in plane by a few degrees, potentially providing a significant enhancement of system contrast, while also potentially simplifying the designs of both modulation optical system 200 and compensator 260. In practice, these rotational adjustments, which were not detailed in U.S. Patent Application Publication No. 2003/0128320 provide contrast enhancements that are very dependent on the performance of a given LCD, the specific design of the accompanying compensator 260, the F# of the light transiting the modulation optical system 200, and the operating temperature of the LCD. With reference to FIG. 5a, the wire grid polarization beamsplitter 240, wire grid polarization analyzer 270, and wire grid pre-polarizer 230 can each be rotated by a few degrees, with the primary goal of enhancing contrast, while also maximizing light efficiency. Specifically, angular rotation of the wire grid polarization beamsplitter by a small fixed amount (angle (β)) introduces some XY retardance, effectively allowing tuning of the polarization compensation by the addition of an A-plate. The actual rotation used, which is typically ~3° to 5°, can be 15° or more, or as little as 1° to 2°, depending on the test conditions. The optimal amount rotation (β) of the wire grid polarization beamsplitter 240 used to increase contrast can depend upon the temperature of the LCD, and the required rotation generally decreases as the LC device is operated at warmer temperatures. Thus it can be important to determine the optimal compensation required for a given LCD at the expected operating temperature. In many systems, the operating temperature of the LCDs may be controlled, either by heating or cooling, to insure operation in the temperature range where the electro-optical response is optimized. In general, the frame sequential modulation contrast of modulation optical system 200, as compared to the uncompensated case, can be enhanced by 2× or more, when (β) rotation of the wire grid polarization beamsplitter 240 is used.

Although the sub-wavelength wires 250 of wire grid polarization beamsplitter 240 primarily cause this device to function as a polarizer, this structure also introduces a small amount of XY retardance. This can be qualitatively understood by considering the properties of a related optical structure; the form birefringent or "moth's eye" optics. To first order, form birefringent optical structures are similar to the wire grid polarizer 100 of FIG. 3, except that the wires 110 are not metallic, but are dielectric. Also the typical visible wavelength form birefringent optical structure has tall dielectric wires (mesas), with the depth of grooves 115 being large compared to the mesa width (aspect ratio >20:1 for example). By comparison, the typical wire grid polarizer has shallow wires, with the ratio of wire thickness (t) to wire width (w) is a modest ~2:1.

As with the wire grid devices, the dielectric form birefringent structures can have a one dimensional pattern of grooves and wires (mesas), similar to that of FIG. 3. Alternately, two dimensional structures, having a pattern of symmetrical dielectric sub-wavelength grooves and mesas, or a pattern of asymmetrical dielectric sub-wavelength grooves and mesas (different in X and Y), are possible. The symmetrical two dimensional structures can function similar to an anti-reflection (AR) coating, with a broad wavelength, polarization insensitive, and angle insensitive response. The asymmetrical two dimensional patterned structures provide a polarization sensitive anti-reflection behavior. The one-dimensional pattern of dielectric sub-wavelength optical micro-structures, similar to that of FIG. 3, are anisotropic, and provide form birefringence (with different optical retardance values in the X and Y directions), as well as anti-reflection properties. The paper, "Design Considerations of Form Birefringent Micro-structures", by 1. Richter et al., (Applied Optics, Vol. 34, No. 14, May 1995, pp. 2421–2429) discusses the detailed design of optical devices. The papers shows how various parameters, such as the pitch (p), width (w), and height or thickness (t) of the mesa/groove structure, can be adjusted to optimize the design. Optics with dielectric micro-structures that are form birefringent can be used as visible spectrum waveplates and retarders, providing 100–400 nm of retardance (up to nearly a wave of retardance), depending on the design. Form birefringence is distinctly different from the more common bulk birefringence, which is observed in crystals, as the latter is caused by anisotropic variations in the electrical properties within the materials.

As the wire grid polarizers and polarization beamsplitters have sub-wavelength structures with XY anisotropy, these structures can introduce small amounts of form birefringence as a byproduct of the design and fabrication of the devices. Furthermore, an alternate improved wire grid polarizer is described in U.S. Pat. No. 6,122,103, which has a sub-wavelength structure where the metal wires are fabricated on top of dielectric ribs of a thickness $t_R$. In that case, the metal wire on dielectric rib structure is utilized to shift transmission resonances to lower wavelengths, thereby extending the wire grid performance more completely across the visible spectrum. The described wire grid polarizer includes an XY anisotropic effective medium structure that likely exhibits XY form birefringence, and thus retardance. The retardance introduces a delay of one polarization relative to the orthogonal polarization, which translates into a phase change $\Delta\phi$ in the polarization of the incoming light. The phase change $\Delta\phi$ can be calculated as $\Delta\phi=2\pi*t*\Delta n/\lambda$, where ($\Delta n$) is the index change ($\Delta n=n_{\parallel}-n_{\perp}$) (birefringence) provided by the structure and (t) is the thickness of the structure. Retardance is the phase change $\Delta\phi$ expressed as distance; for example a $\pi/2$ phase change $\Delta\phi$ provides a quarter wave $\lambda/4$ retardance, which at 550 nm equals ~138 nm retardance. However, while anisotropic form birefringence can be anticipated to exist in wire grid polarizers and polarization beamsplitters, the application of a controlled rotation to the wire grid polarizers, as they are used in a modulation optical system 200, with the intention of introducing small amounts of XY retardance and thus tuning the contrast, is neither obvious nor anticipated by the prior art. Moreover, the interaction of the wire grid polarizer rotation as a mechanism for simplifying the construction of the modulation optical system 200 and compensator 260 is also not anticipated by the prior art.

Although the wire grid pre-polarizer 230, the wire grid polarization beamsplitter 240, and the wire grid polarization analyzer 270 can all be rotated to some effect to enhance contrast or light efficiency, it is the rotation of the wire grid polarization beamsplitter 240 which is most beneficial. The small XY retardance of the wire grid structure is more or less parallel or perpendicular to its wires for the light coming along the system optical axis 275. When the wire grid polarization beamsplitter is rotated by some controlled angular amount (β), from its nominal position (β=0°), its XY retardance can be oriented to be more perpendicular to the XY retardance of the LCD and consequently better compensate the LCD. Rotation of the wire grid polarization beamsplitter 270 alone (the wire grid pre-polarizer 230 and the wire grid polarization beamsplitter 240 are both stationary (non-rotated)) provides the greatest portion of the observed contrast enhancements (>95% in some cases) discussed below.

Referring again to FIG. 4, three further examples of measured contrast are given for modulation optical system 200, where spatial light modulator 210 was a VA-LCD (specifically device "A"), and rotation of the wire grid polarizers was used to adjust the contrast. In the first example, the contrast was measured where compensator 260 was the exemplary package of a C-plate with 180 nm retardance (Z) and an A-plate with 12 nm retardance (XY), and the wire grid polarization beamsplitter 240 and the wire grid polarization analyzer 270 were both tweaked angularly. The result, combination XYZ compensator and wire rotation contrast 460 shows that the measured contrast of ~1,600:1 at F/2.3 is basically equivalent to the XYZ compensated system contrast 450 provided by this compensator alone. However, the wire rotation does give a small contrast enhancement at the higher F-numbers. This measured combination XYZ compensator and wire rotation contrast 460 is of course much higher than the uncompensated system contrast 300. To obtain this result, the wire grid polarization beamsplitter 240 was rotated by $\beta\sim0.5-2°$, while the wire grid polarization analyzer 270 was rotated by $\alpha\sim1-3°$ in the same direction. While both the wire grid polarization beamsplitter 240 and the wire grid polarization analyzer 270 were rotated the described amounts ($\beta$ and $\alpha$ respectively), these devices are still oriented with their sub-wavelength wires oriented substantially "vertically" ("into the page") relative to FIG. 3. This data basically suggests that modulation optical system 200 can be constructed with a LCD 210 and a compensator 260, while the wire grid polarizers are tweaked angularly to further enhance system contrast.

As the second further example depicted in FIG. 4, the contrast was measured where compensator 260 comprised only a C-plate with 220 nm retardance (Z), and the wire grid polarization beamsplitter 240 and the wire grid polarization analyzer 270 were both rotated angularly. The result, identified as combination Z compensator and wire rotation contrast 465, shows that the measured contrast of ~1,100:1 at F/2.3 for this combination is better than both the measured uncompensated system contrast 300 and the Z only compensated contrast 455, but less than either the XYZ compensated system contrast 450 or the combination XYZ compensator and wire rotation contrast 460. To obtain this result, the wire grid polarization beamsplitter 240 was rotated by $\beta\sim3-5°$, while the wire grid polarization analyzer 270 was rotated by $\alpha\sim6-7°$ in the same direction. Rotation of the wire grid polarization beamsplitter 240 introduced an estimated ~6–8 nm of XY retardance, which was less than the ~12 nm of XY retardance needed by the LCD ("device "A"") to maximize contrast. In this case, the modulation optical system 200, using the wire grid polarizers with selective rotation, a LCD 210 and a compensator 260 provides enhanced contrast at F/2.3 which is more than the uncompensated contrast, but less than the contrast with an optimized compensator. This means that the in plane rotation of the wire grid polarizers can potentially be used to boost contrast while simplifying the design and structure of the associated polarization compensator (the exemplary compensator was Z-only).

As the third further example depicted in FIG. 4, the contrast was measured for a modulation optical system 200, which included the wire grid polarization beamsplitter 240, the wire grid polarization analyzer 270, the wire grid pre-polarizer 230, and the LCD 210 (device "A'"), but which was tested without compensator 260, while the wire grid polarization beamsplitter and analyzer were both rotated angularly. The result, identified as rotation only contrast 470, shows ~700:1 contrast at F/2.3, which is better than the measured uncompensated system 300 and comparable to the Z only compensated contrast 455. More significantly, at F/2.3, the rotation contrast for this example (LCD 210 as device "A") is below the ~1,000:1 target specification for system contrast, and below the measured XYZ compensated system contrast 450 and the combination XYZ compensator and wire rotation contrast 460. Thus, for an LCD 210 similar to exhibit device "A", in plane rotation of the wire grid devices does not provide sufficient retardance to compensate for the residual retardance in the device, and a further polarization compensator is needed.

More generally, FIG. 4 shows that the contrast for a modulation optical system 200, which operates at ~F/4 or less, and employs a combination of an LCD 210 and a compensator 260, whose XY and Z retardances are well matched, are higher than the contrasts provided by other means. Specifically, for this example (VA-LCD device "A"), both the XYZ compensated system contrast 450 and the combination XYZ compensator and wire rotation contrast 460 are both significantly higher than the wire rotation only contrast 470 at F-numbers of ~4.0 or less. Experimentation has also shown the ~F/4 to ~F/6 region to be a crossover region, where depending on the specific LCD and specific compensator used, the highest contrast may be achieved with a polarization compensator, or by in plane rotation of the wire grid polarizers, or by a combination of the two. Even in the cross over F/4 to F/6 region, the use of a polarization compensator that is well matched to a given LCD, will generally provide the highest contrast. However, in this crossover F/4 to F/6 region, the contrast provided by rotation of the wire grid polarizers may be high enough (>1,000:1) to satisfy the contrast requirements for a demanding application such as digital cinema projection, without using a polarization compensator, for a significant selection of the available LCDs from the production line. Above F/6, the contrast provided by rotation of the wire grid polarizers (470) generally matches or exceeds the contrast obtained when a polarization compensator is used. In that case, modulation optical system 200 can be simplified, as compensator 260 can be omitted and superior contrast can still be obtained.

The contrast plots versus F-number provided in FIG. 4 were all obtained specifically from tests with the VA-LCD identified as device "A". An equivalent range of measurements were completed using the previously described VA-LCDs identified as device "B" and device "C", tested within modulation optical system 200. Although these devices exhibited rather different behavior than device "A", including significantly different innate internal residual XY and Z retardances, the conclusions obtained with device "A" and shown in FIG. 4, generally applied to these devices as well. In particular, VA-LCD devices "A" and "C" have residual XYZ retardances such that both devices provide the baseball pattern type iso-contrast when tested without polarization compensation, although device "C" under performed (less contrast) device "A" for each of the test conditions. However, device "C", like the "device "A" data shown in FIG. 4, provided the highest contrast below F/4 for the test cases of XYZ compensated system contrast 450 and combination XYZ compensator and wire rotation contrast 460 (~1100:1 and higher), with the combination Z compensator and wire rotation contrast 465 and the wire rotation only contrast 470 at intermediate values (800:1+ and 600:1+ respectively), and the Z only compensated contrast 455 and uncompensated system contrast 300 providing the lowest contrast (~500:1). Likewise, the F/4 to F/6 region was also a crossover region for device "C", where the highest contrast was obtained by using a polarization compensator, but compensation by means of wire grid rotation alone provided high contrasts, which exceeded some compensator combinations where actual polarization compensators were used. Finally, above F/6, the test results with device "C" were similar to those of device "A", such that the contrast provided by rotation of the wire grid polarizers (470) generally matched or exceeded the contrast obtained when a polarization compensator is used.

The results for the VA-LCD device "B", which is the device which possesses the innate iron cross behavior as observed look at the iso-contrast, showed significantly different behavior relative to devices "A" and "C", and yet the general conclusions were similar. In particular, with this device, the highest contrast was obtained using a Z only compensator (the 220 nm Z compensator), rather than with the XYZ compensator (the 180 nm Z and 12 nm XY compensator), although the contrast for both was quite high (above 1,500:1 at F/2.3 and >2,000:1 over the remaining F/3 to F/10 range). The contrast provided when using device "B" in a "native" state, without assistance from either a polarization compensator or wire grid polarizer rotation, was lower than the prior cases with the Z only compensator or the XYZ compensator. In particular, F/2.3 at the native state contrast failed the >1,000:1 target for digital cinema. However, the native contrast for this same device "B" exceeded >1,500:1 over the F/4 to F/10 range. Certainly polarization compensation by means of rotation of the wire grid polarizers may provide diminished advantages for iron cross iso-contrast devices than for baseball pattern iso-contrast devices, when compared to using a simple Z only compensator or operating the device "native" (above ~F/4). However, in the particular case of VA-LCD device "B", the pure iron cross behavior was available only when this device was tested in its off state, without even a bias voltage. As soon as a bias voltage was applied, the iron cross pattern shifted into a baseball pattern, albeit a darker, higher contrast one than observed with either devices "A" or "C". In operation, device "B" possesses a small amount of residual XY retardance (~2~3 nm), which can be compensated for by rotating the wire grid polarizers.

In general, the experiments with the various VA-LCDs indicate that in plane rotation of the wire grid polarizers within a modulation optical system 200 contribute an adjustable amount of XY retardance, which can be used for polarization compensation, thereby boosting contrast. Controlled rotation of the wire grid polarizers generally increases the measured contrast across the entire tested F/2.3 to F/10 region, possibly eliminating the need to use a polarization compensator. This is particularly true for optical systems operating at speeds of F/6 and higher. For demanding applications, requiring modulation contrasts of 1,000:1 and higher, and operating at speeds below F/4, the best results are achieved by using a polarization compensator which provides XY and Z retardances that are well matched to the accompanying LCD. However, controlled rotation of the wire grid polarizers can be used to further tune or maximize contrast in such cases even in this region. The F/4 to F/6 region provides mixed results, where rotation of the wire grid polarizers provides significant contrast enhancement, and may be sufficient by itself, but where the use of a polarization compensator, by itself or in combination with wire grid rotation, generally provides significant further contrast enhancement.

As noted previously, the contrast enhancements provided by rotation of the wire grid polarizers are primarily obtained by the in plane rotation of the wire grid polarization beamsplitter 240 by a small amount ($\beta$) within modulation optical 200 (see FIG. 5a). Rotation of the wire grid beamsplitter provides the greatest benefit, as it is by that means that the XY retardance of the anisotropic structure is actually utilized. As the amount of rotation is generally small ($\beta$~3–5°), the efficiency loss through the polarization analyzer is generally small. The polarization analyzer, which is nominally also a wire grid polarizer, can be rotated in plane by an angle ($\alpha$), as shown in FIG. 5a, to further boost contrast and system efficiency. In most of the experiments, the wire grid polarization analyzer 270 was rotated by a relatively small angle ($\alpha$~6–7°) in the process of tuning contrast and efficiency. The wire grid polarization analyzer 270 was rotated in the same direction as was the wire grid polarization beamsplitter 240. Although the two could be rotated by the same amount ($\alpha=\beta$), in general the best results were obtained when the analyzer rotation was larger ($\alpha>\beta$). However, the gains provided by rotation of the wire grid polarization analyzer 270 were small enough that in some case it may be sensible to leave the analyzer stationary (non-rotated). In the above experiments, when the wire grid polarization analyzer was rotated by a larger angle ($\alpha>8°$) both the measured contrast and light efficiency generally started to decrease. In some test cases, the wire grid polarization beamsplitter 240 was rotated by much larger angles ($\beta$~15° or more) while optimizing contrast. In such cases, rotating the (wire grid) polarization analyzer by an angle ($\alpha$) can provide greater benefits.

The concepts of this system, which relate to a modulation optical system 200, wherein the rotation of the wire grid polarizers, and particularly the rotation of the wire grid polarization beamsplitter 240, is used to introduce XY retardance and thus partially compensate for the XY retardances innate to the neighboring LCD 210, have been specifically described relative to the system depicted in FIGS. 1 and 3. In that system, the wire grid polarization beamsplitter 240 is disposed to receive light from the LCD 210 and compensator 260, and then reflect the modulated image bearing light 290 into the projection lens 285. It should be understood that these same principles of utilizing rotation of the wire grid polarizers to provide polarization compensation for the LCD 210 can also be applied to a modulation optical system 200 where the wire grid polarization beamsplitter 240 is disposed to transmit the modulated image bearing light beam 290 into the projection lens 285.

Figure 7:
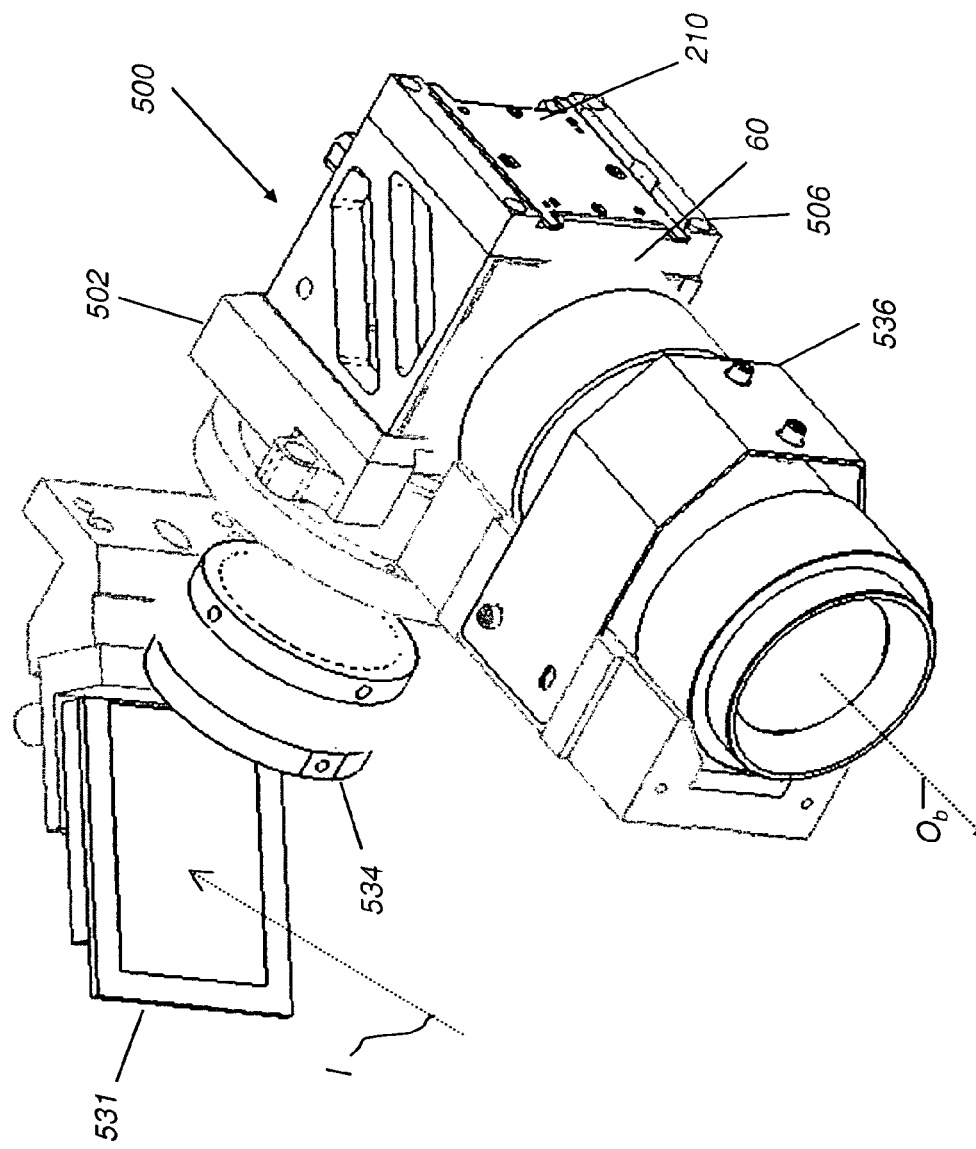
FIG. 7 is a perspective view showing the components of the housing of the present invention.

Referring to FIG. 7, there is shown a perspective view of a housing 500 for mounting spatial light modulator 210 and its supporting polarization components for a single color modulation channel, the blue channel in a preferred embodiment, to a chassis wall within the projection apparatus. Monochrome illumination is directed to turning mirror 531 which reflects illumination through illumination relay lens 534 and through a ring bore 502 into housing 500. Output modulated light along axis $O_b$ is then directed through imaging relay lens 536 to combining and projection optics, as was described in commonly assigned U.S. Patent Application Publication No. 2003/0133079 (Cobb). A modulator mount 506 is attached as part of housing 500.

Figure 8:
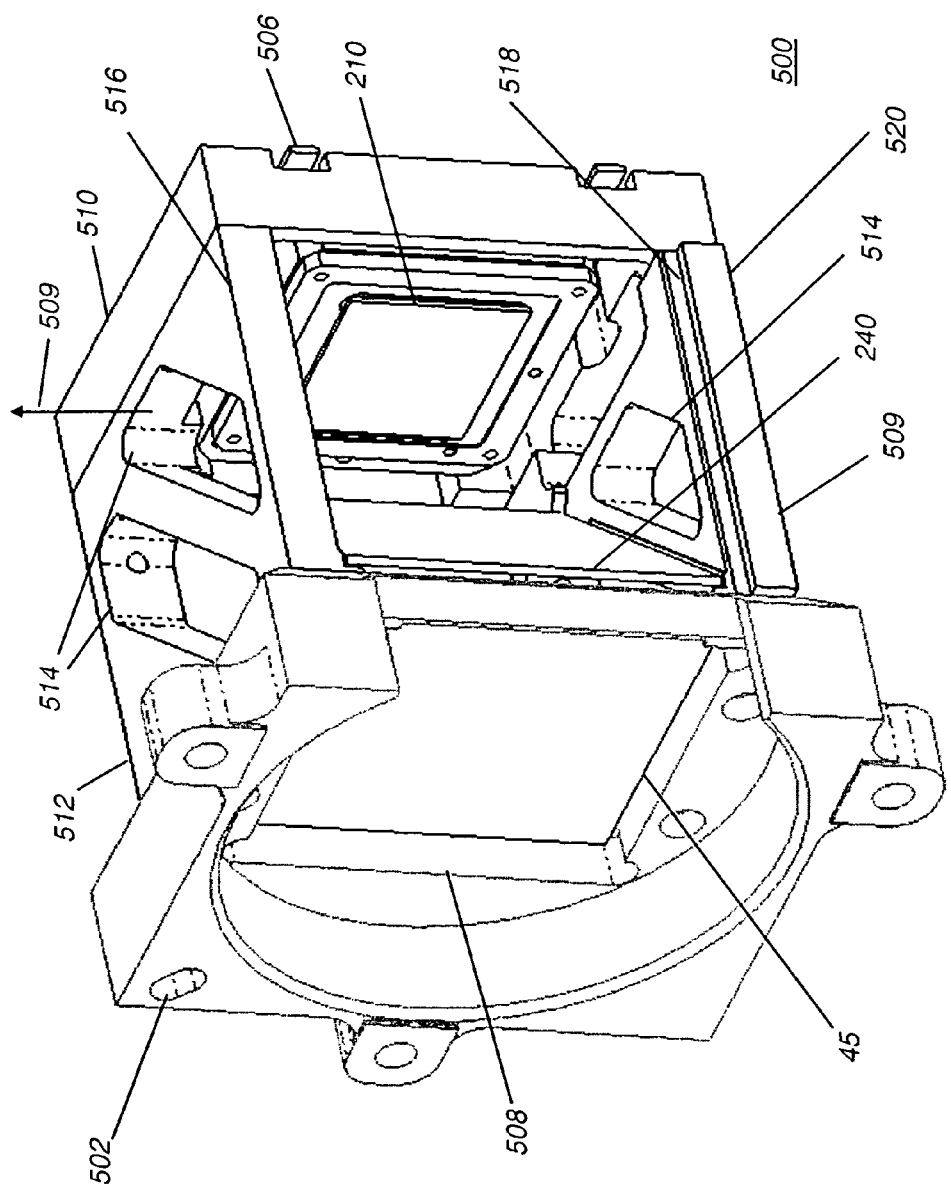
FIG. 8 is a perspective view showing internal components of the housing of the present invention, with the analyzer removed.

Referring to FIG. 8, there is shown a perspective front view with polarization analyzer 60 removed to show internal components and overall structure of housing 500. Modulator mount 506 attaches to a modulator mounting plate 510. Fitted into modulator mounting plate 510 are a top plate 512 and a base plate 520, separating modulator mounting plate 510 and ring bore 502. Within housing 500, a wire grid polarizing beamsplitter 240 is disposed at a fixed diagonal angle relative to the surface of spatial light modulator 210. A registration recess 518 is provided along the edge of base plate 520, providing a seat for the bottom edge of polarization analyzer 60. Pre-polarizer 45 is mounted within a recess 508 provided by ring bore 502 and is lightly fixed in position using a flexible, compliant adhesive, such as an RTV type adhesive.

Figure 9:
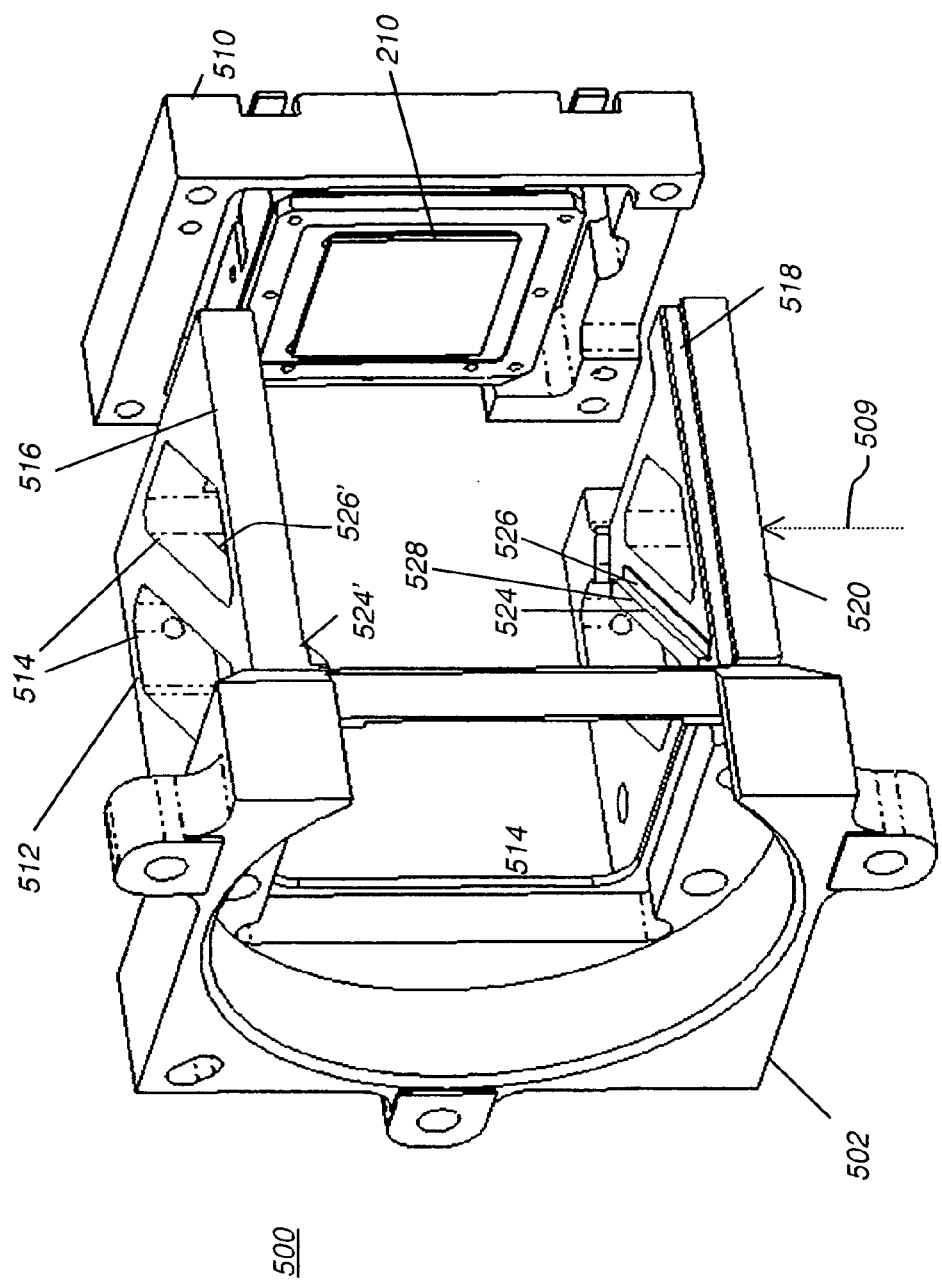
FIG. 9 is a perspective, exploded view showing the key support structure separated from the mounting plate used for attachment of the spatial light modulator.
Figure 10:
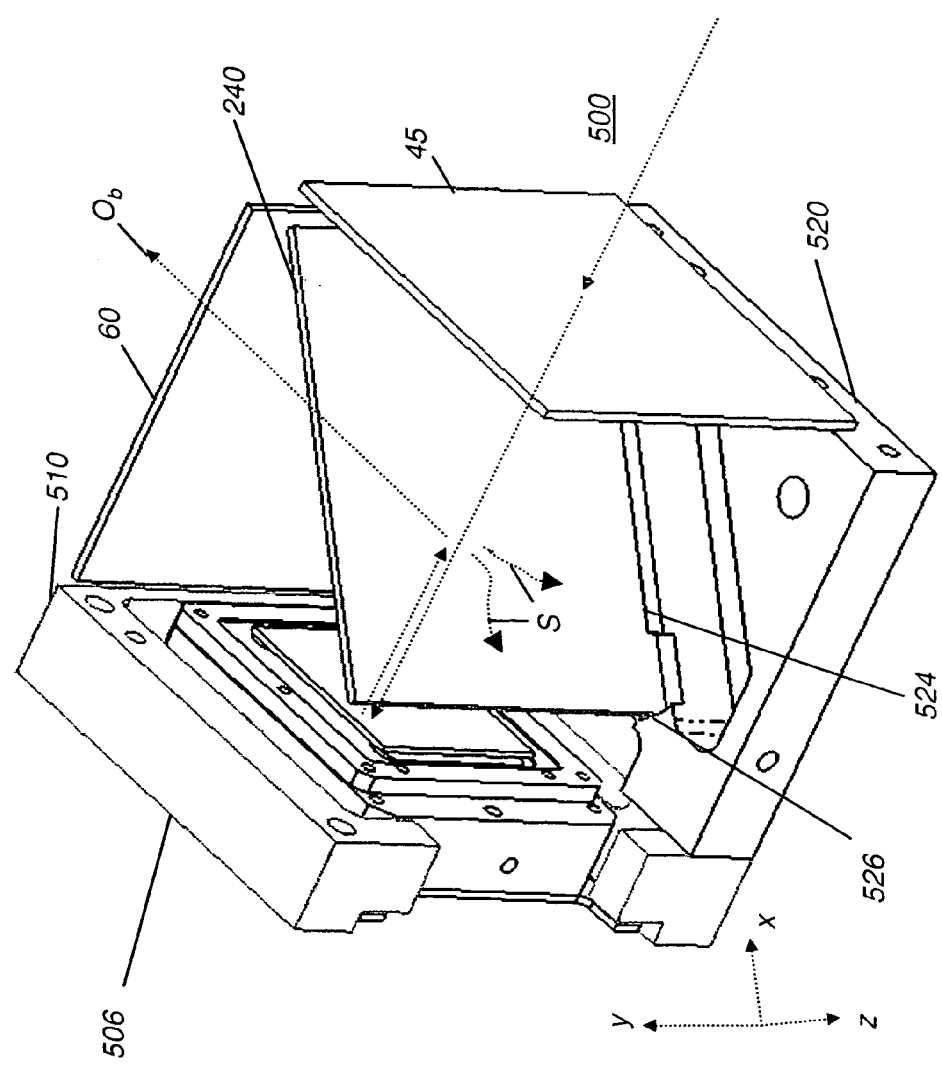
FIG. 10 is a perspective view showing internal components of the housing of the present invention for modulation and polarization, with the top cover plate removed.

Referring to FIG. 9, there is shown a perspective view of housing 500 with modulator mounting plate 510 removed. The portion of housing 500 consisting of top plate 512, base plate 520, and ring bore 502 can be fabricated as a single unit, such as by casting. In whatever manner housing 500 is fabricated, corresponding support features on facing surfaces of base plate 520 and top plate 512 must be mutually aligned in order to register wire grid polarizing beamsplitter 240 and polarization analyzer 60 between these surfaces with minimal constraint. As is shown in FIGS. 8, 9, and 10, wire grid polarizing beamsplitter 240 is fitted against coplanar registration surfaces 524 and 524' on base plate 520 and top plate 512, respectively. The bottom edge of wire grid polarizing beamsplitter 240 seats atop a beamsplitter seating base 528. In one embodiment, coplanar registration surfaces 524 and 524' are aligned to be coplanar by machining, following assembly of top plate 512 and base plate 520 to ring bore 502. Edge guides 526 and 526' are likewise machined in the same operation to be colinear with the edge of wire grid polarizing beamsplitter 240 when in housing 500.

Similarly, for supporting polarization analyzer 60, a registration recess 518 on base plate 520 is aligned so that its rear surface is coplanar with a side surface 516 of top plate 512. Slots 514 are provided in top and base plates 512 and 520, maximizing air flow 509, ambient or dedicated forced air, across one or both surfaces of wire grid polarizing beamsplitter 240, also providing additional cooling to adjacent polarization and modulation components. Furthermore, cooling wire grid polarization beamsplitter 240 can have the added benefit of preventing a differential thermal expansion of polarizing beamsplitter 240 and/or its mount, that could cause wire grid polarizing beamsplitter 240 to tip, tilt, and/or twist from its normal position and thus induce a convergence (screen position) error.

Base plate 520 and top plate 512 can be fitted into modulator mounting plate 510 and ring bore 502 using conventional mating methods for machined or cast metal components. Pins and detents may be used for alignment of these components to form the outer shell of housing 500 as shown in FIG. 8. The components are then screwed together to provide housing 500 as a single, modular component. For uniform thermal expansion, similar materials are used for fabrication of base plate 520, top plate 512, modulator mounting plate 510, and ring bore 502. In a preferred embodiment, base plate 520, top plate 512, modulator mounting plate 510, and ring bore 502 are made of aluminum. Alternately, other types of metals, polymer composites, or ceramic composites could be used. Key criteria for materials selection include a low coefficient of thermal expansion and high thermal conductivity; additional advantages would also be afforded by having a high Young's Modulus and a low material density.

Precision alignment with the illumination system (axis I as shown in FIG. 7) is not critical; there is some tolerance allowable for alignment in the path of unmodulated light. Advantageously, housing 500 provides self-centering to illumination axis I, within allowable tolerance, so that further manual alignment is unnecessary. Referring back to FIG. 7, the barrel of illumination relay lens 534 provides this self-centering by fitting into ring bore 502, which is itself fastened to a chassis wall (not shown).

Alignment of Polarizing Components

Referring to FIG. 10, there is shown a perspective view of polarization and modulation components, with top plate 512 and ring bore 502 removed and with polarization analyzer 60 shown in place. FIG. 10 shows details of the configuration of modulator mounting plate 510 and of base plate 520. As was noted with respect to FIG. 9, base plate 520 has coplanar registration surface 524, or an equivalent type of mechanical feature that acts as a datum for seating wire grid polarizing beamsplitter 240 at the needed fixed angle with respect to spatial light modulator 210. In a preferred embodiment, this fixed angle is at 45 degrees. Beamsplitter seating base 528, shown most clearly in FIG. 9, then provides a vertical datum for alignment of wire grid polarizing beamsplitter 240 in the y direction as indicated in FIG. 10. Coplanar registration surface 524 provides a datum for alignment of wire grid polarizing beamsplitter 240 in the z-direction. An edge guide 526 in base plate 520 serves as a datum point for horizontal alignment of wire grid polarizing beamsplitter 240 along coplanar registration surface 524, that is, in the x direction as indicated in FIG. 10. As is shown in FIG. 9, a corresponding edge guide 526' in top plate 512 is aligned with edge guide 526 in base plate 520 to provide a pair of datum points for horizontal x-direction) alignment of one edge of polarizing beamsplitter 240 that extends between base plate 520 and top plate 512.

In the design of housing 500, thermal expansion of polarizing components is permitted in controlled directions, opposite datum points or surfaces. The use of edge guide 526 and coplanar registration surface 524 allows thermal expansion of wire grid polarizing beamsplitter 240 outward from the corner point of contact near edge guide 526. A surface of wire grid polarizing beamsplitter 240 near its bottom edge is seated against coplanar registration surface 524 on base plate 520; the top edge of wire grid polarizing beamsplitter 240 lies against the surface of coplanar registration surface 524' on top plate 512, with allowance provided for thermal expansion along this top edge. A small amount of flexible, compliant adhesive, such as an RTV type adhesive, can be used to stabilize the bottom edge of wire grid polarizing beamsplitter 240 against seating base 528 and to stabilize the top edge of wire grid polarizing beamsplitter 240 to the surface of coplanar registration surface 524' on top plate 512. Similarly, analyzer 60, seated against registration recess 518 as is shown in FIG. 9, can expand at its top edge, which is flexibly adhered to side surface 516. By allowing some tolerance for thermal expansion and allowing expansion only in predictable directions (+x, +y, and −z as shown in FIG. 10), the design of housing 500 thereby minimizes bending or other distortion of wire grid polarizing beamsplitter 240 and of analyzer 60 due to heat effects. Analyzer 60 is also allowed some amount of movement within predictable directions.

It can be observed that the fabrication of housing 500 as shown in FIGS. 8, 9, and 10 allows an initial, approximate positioning of polarization and modulation components relative to projection optics for a color channel, that is, providing initial alignment of the three polarization components (pre-polarizer 45, wire grid polarizing beamsplitter 240, and polarization analyzer 60), and of spatial light modulator 210. There remains, of course, some small tolerance related to alignment of the edges of wire grid polarizing components with the precise polarization axis of these components, accurate to within about 0.5 degrees using current fabrication techniques.

Figure 11:
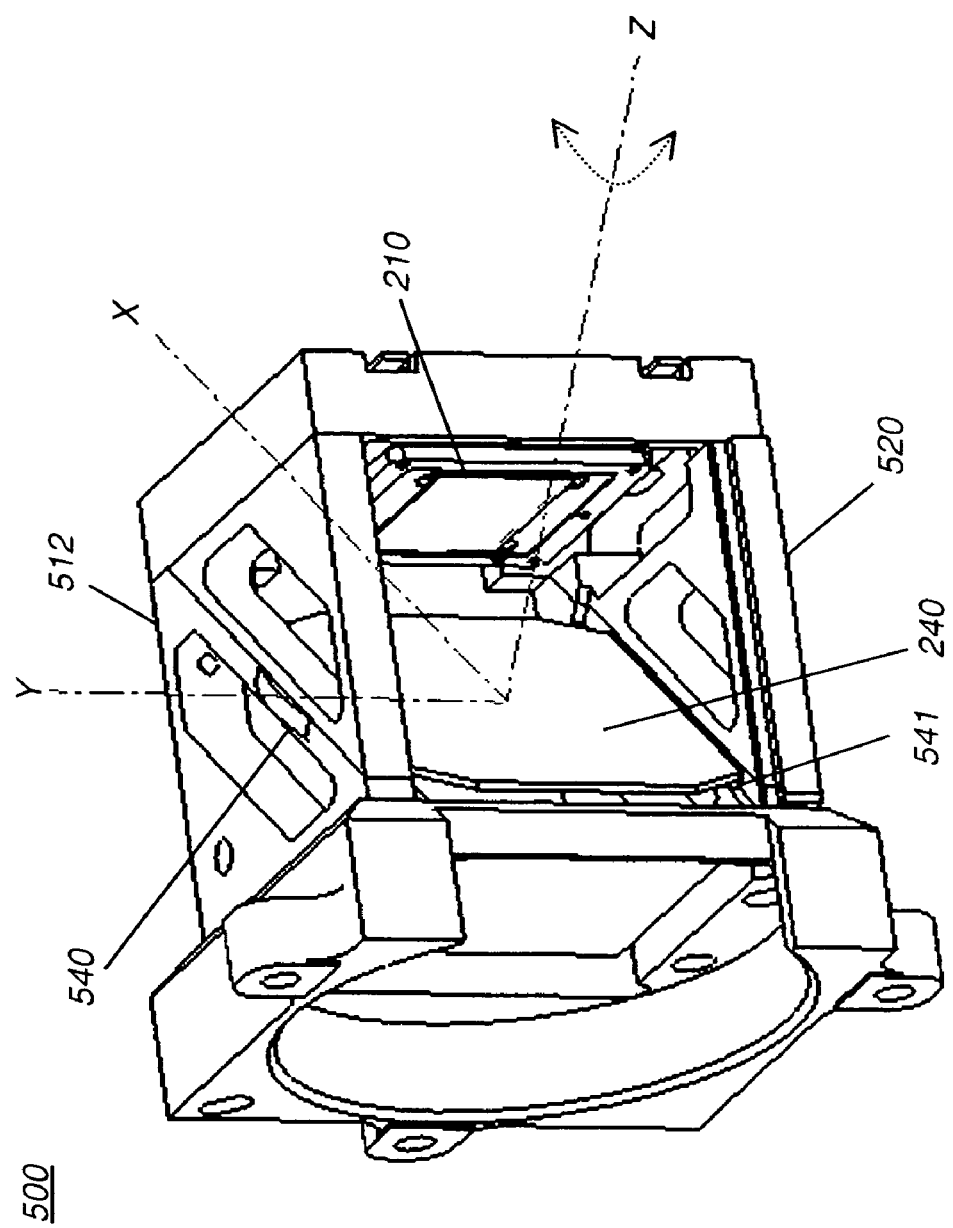
FIG. 11 is perspective view showing the components of the housing of the present invention including the rotatable wire grid polarization beamsplitter.

Referring to FIG. 11, there is shown a perspective view of housing 500 for mounting spatial light modulator 210 and its supporting polarization components for a single color modulation channel according to the present invention. The arrangement of housing 500 in FIG. 11 is similar to that of FIG. 8, with the addition of top and bottom rotation mechanisms 540 and 541 for allowing a measure of manual rotation of polarization beamsplitter 240 in the X-Y plane. Top rotation mechanism 540 is shown exposed through a cutout in top plate 512. Bottom rotation mechanism 541, not readily visible when seated from the perspective of FIG. 11, is accessible through a similar cutout in base plate 520. With this arrangement, rotation of top or bottom rotation mechanism 540 or 541 allows approximately +/−25 degrees of rotational adjustment about the z-axis, coplanar relative to the X-Y plane. Throughout this rotational range, this configuration maintains polarization beamsplitter 240 at the proper planar angle with respect to spatial light modulator 210.

Figure 12:
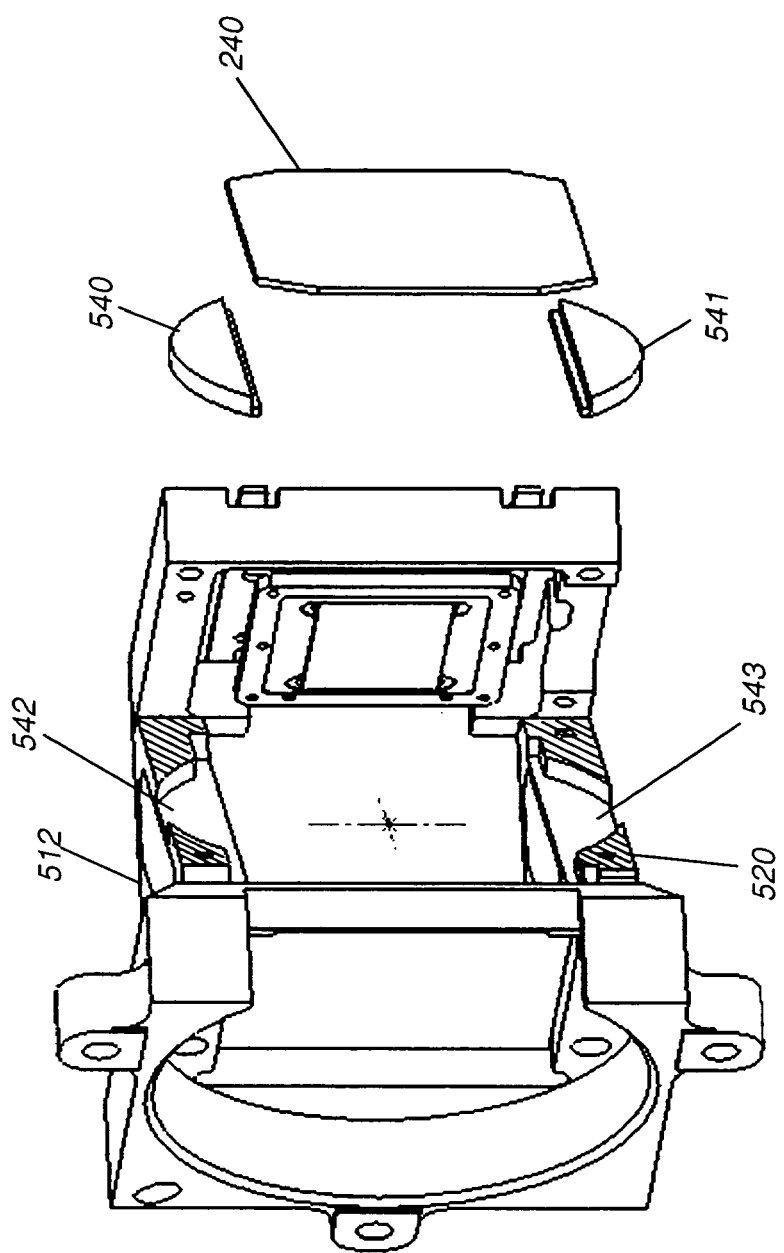
FIG. 12 is an exploded view showing the components of the housing of the present invention and the components of the rotatable wire grid polarization beamsplitter.

Referring to FIG. 12, there is shown how polarization beamsplitter 240 is adapted for rotation using this configuration. In FIG. 12, only a sectioned view of base plate 520 and top plate 512 is shown, in order to show arcuate recesses 542 and 543 that are provided for seating top and bottom rotation mechanisms 540 and 541 respectively. Using this arrangement, polarization beamsplitter 240 is fitted between top and bottom rotation mechanisms 540 and 541. The assembled mechanism is then seated within recesses 542 and 543. Recesses 542 and 543 are arcuately contoured to correspond to supporting top and bottom rotation mechanisms 540 and 541, to allow rotation of polarization beamsplitter 240.

In the embodiments shown in FIGS. 11 and 12, top and bottom rotation mechanisms 540 and 541 act as holders to allow manual adjustment of polarization beamsplitter 240 rotation about the Z-axis. It can be readily appreciated that some form of automated adjustment could alternately be implemented, coupling a motor or other type of actuator to rotation mechanisms 540 or 541.

In practice, it has been found that the adjustment task works best by optimizing the performance of housing 500 components for the dark state. The adjustment process uses iterative adjustment and visual assessment of resulting darkness on a projection screen, until acceptable contrast is achieved. When the adjustment is satisfactory, components can be potted in place, using conventional optics assembly techniques. Not shown in FIGS. 11 and 12 are auxiliary components that can be used to provide a holding force for maintaining rotational orientation and coplanar positioning of polarization beamsplitter 240 during adjustment. For example, spring-force or magnetic attraction can be used for temporarily holding polarization beamsplitter 240 angle at a test position during contrast assessment.

With the configuration of FIGS. 11 and 12, housing 500 allows straightforward adjustment of the rotational angle of polarization beamsplitter 240 about the optical axis, without compromising its in-plane position relative to spatial light modulator 210. The ability to make this adjustment enables this angular position of a wire grid polarization beamsplitter 240 to be optimized, thereby reducing or eliminating requirements for an A-plate compensator for incident illumination to an LCD spatial light modulator 210. The configuration shown in FIGS. 11 and 12 is advantaged for allowing a significant range of angular movement with minimum mechanical stress to the substrate of polarization beamsplitter 240.

Figure 13:
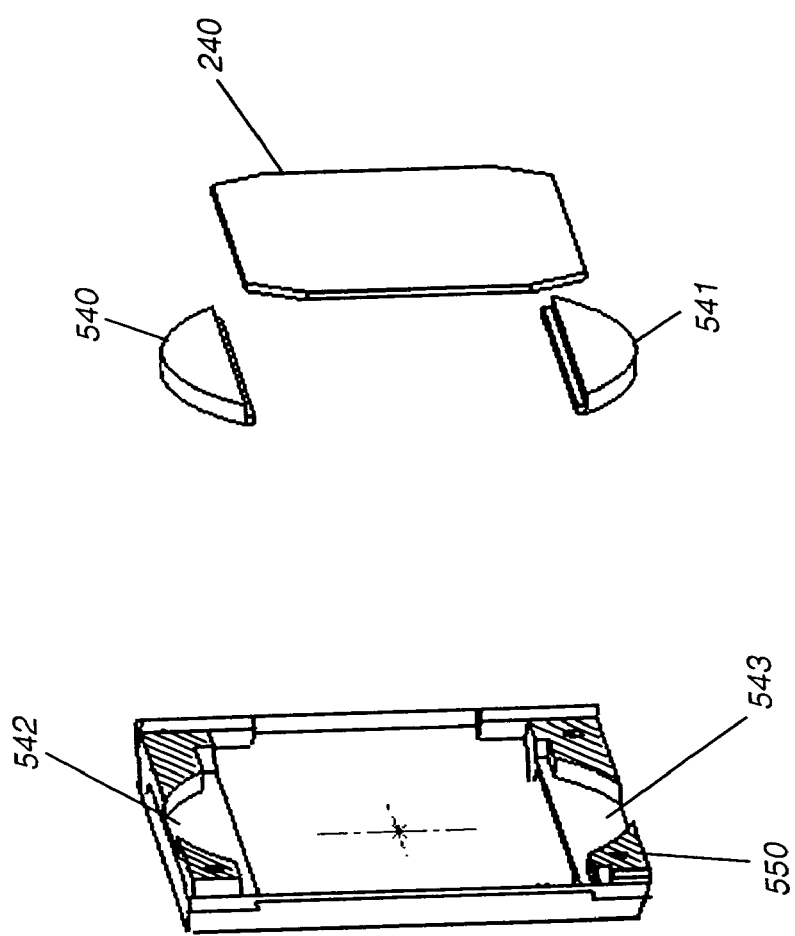
FIG. 13 is an exploded view showing a mounting apparatus for an optical component, allowing a measure of alignment while maintaining the optical component within a fixed plane.

Referring to FIG. 13, there is shown the arrangement of a generalized mount 550 that has a suitable arrangement of recesses 542, 543. Mount 550 may be one piece, as shown, or may be embodied using surfaces that are spaced apart, as in the embodiments of FIGS. 7–12. Rotation mechanisms 540, 541 act as holders to seat opposite edges of polarization beamsplitter 240 or other optical component in recesses 542, 543, allowing rotation while maintaining a coplanar relationship. As in the preferred embodiment, the arrangement of rotation mechanisms 540, 541 allows expansion of the supported optical component without induced mechanical stress.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. Thus, what is provided is a housing for mounting a wire grid polarization beamsplitter wherein the beamsplitter can be rotated, over a range of angles, to an optimized position. This solution allows expansion of polarization beamsplitter 240 with minimized thermal stress or mechanical stress at interfaces.

PARTS LIST 10 digital projection apparatus
15 light source
20 illumination optics
40 modulation optical system
45 pre-polarizer
50 wire grid polarization beamsplitter
55 spatial light modulator
60 polarization analyzer
62 recombination prism
70 projection optics
75 display surface
100 wire grid polarizer
110 conductive elements or wires
115 grooves
120 dielectric substrate
130 beam of light
132 light source
140 reflected light beam
150 transmitted light beam
200 modulation optical system
210 spatial light modulator (LCD)
220 illumination light beam
225 condenser
230 pre-polarizer
240 wire grid polarization beamsplitter
245 dielectric substrate
250 sub-wavelength wires
260 compensator
270 polarization analyzer
275 optical axis
280 recombination prism
285 projection lens
290 modulated image-bearing light beam
300 uncompensated system contrast
320 iron cross pattern
325 baseball pattern
350 pre-polarized beam
355 transmitted beam
350 modulated beam
365 leakage light
370 transmitted light
450 XYZ compensated system contrast
455 Z only compensated contrast
460 combination XYZ compensator and wire rotation contrast
465 combination Z compensator and wire rotation contrast
470 wire rotation only contrast
500 housing
502 ring bore
506 modulator mount
508 recess
509 air flow 510 modulator mounting plate
510 top plate
514 slots
516 side surface
518 registration recess
520 base plate
524 coplanar registration surfaces
524' coplanar registration surfaces
526 edge guides
526' edge guides
528 beamsplitter seating base
531 turning mirror
534 illumination relay lens
536 imaging relay lens
540 rotation mechanism
541 rotation mechanism
542 recess
543 recess
550 mount

What is claimed is:

1. A housing for mounting a beamsplitter and a spatial light modulator in alignment with an output optical path, comprising:
 (a) a front plate having an opening for admitting incident illumination provided along an illumination axis;
 (b) a modulator mounting plate, spaced apart from and substantially parallel to the front plate, for mounting the spatial light modulator in the optical output path of the illumination axis;
 (c) first and second polarizer support plates, spaced apart from each other and extending between the front plate and the modulator mounting plate;
 respective facing inner surfaces of the first and second support plates providing support features for supporting the beamsplitter between the facing inner surfaces within a fixed plane relative to the illumination axis, the support features being configured to allow rotation of the beamsplitter, over a range of angles, within the fixed plane; and
 the beamsplitter being extended between and substantially normal to the facing inner surfaces, the surface of the beamsplitter maintained at a fixed angle with respect to the surface of the spatial light modulator on the modulator mounting plate, the fixed angle defining an output optical axis and working distance along the output optical path.

2. A housing according to claim 1 wherein the first and second polarizer support plates further provide a pair of coplanar first and second edge support elements for registering an edge of the beamsplitter.

3. A housing according to claim 1 wherein the fixed angle of the surface of the beamsplitter with respect to the surface of the spatial light modulator on the modulator mounting plate is a diagonal.

4. A housing according to claim 1 wherein rotation of said beamsplitter is provided manually.

5. A housing according to claim 1 wherein the beamsplitter is fitted in a retaining mechanism.

6. A housing according to claim 1 wherein the beamsplitter is a wire grid beamsplitter.

7. A housing for mounting a wire grid polarizing beamsplitter and a spatial light modulator in alignment with an output optical path, comprising:
 (a) a front plate having an opening for admitting incident illumination provided along an illumination axis through a pre-polarizer component;
 (b) a modulator mounting plate, spaced apart from and parallel to said front plate, for mounting the spatial light modulator in the path of said illumination axis;
 (c) first and second polarizer support plates, spaced apart from each other and extending between said front plate and said modulator mounting plate;
 said respective facing inner surfaces of said first and second support plates providing coplanar support features for supporting the wire grid polarizing beamsplitter extended between said inner surfaces;
 wherein said first and second polarizer support plates further provide a pair of coplanar first and second edge support elements for registering an edge of the wire grid polarizing beamsplitter;
 said first and second polarizer support plates further comprising coplanar support features for mounting an analyzer in the output optical path;
 said wire grid polarizing beamsplitter being extended between and normal to said facing inner surfaces, the surface of the wire grid polarizing beamsplitter at a fixed angle with respect to the surface of the spatial light modulator on said modulator mounting plate, said fixed angle defining an output optical axis along the output optical path; and
 wherein said wire grid polarization beamsplitter is rotatable in-plane by a fixed amount.

8. A housing apparatus for an optical component comprising:
 (a) a first holder for seating a first edge of the optical component, the first holder comprising an arcuate surface fitting within a corresponding first arcuate recess in the housing;
 (b) a second holder for seating an opposite edge of the optical component, the second holder comprising an arcuate surface fitting within a corresponding second arcuate recess in the housing; and
 wherein the first and second holders, when fitted within their corresponding first and second arcuate recesses, register the optical component within a fixed plane and allow an amount of positional rotation of the optical component within the fixed plane.

9. A housing apparatus according to claim 8 wherein the optical component is a wire grid polarization beamsplitter.

10. A housing for mounting a wire grid polarizing beamsplitter and a spatial light modulator in relative alignment with respect to an output optical axis, comprising:
 (a) a modulator mounting plate for mounting the spatial light modulator to receive incident illumination along an illumination axis;
 (b) first and second polarizer support plates, spaced apart from each other and extending substantially orthogonally with respect to the modulator mounting plate;
 the polarizing beamsplitter fitted with a retaining mechanism, forming a beamsplitter assembly thereby;
 each of the first and second polarizer support plates comprising a coplanar support feature for maintaining alignment of the beamsplitter assembly within a fixed plane substantially diagonal to the spatial light modulator; and
 wherein at least one of the first and second polarizer support plates further comprises a cutout for rotating the beamsplitter assembly with respect to the output optical axis and within the fixed plane.

* * * * *